(12) United States Patent
Marggraff et al.

(10) Patent No.: US 12,125,407 B2
(45) Date of Patent: Oct. 22, 2024

(54) SYSTEMS AND METHODS TO SPECIFY INTERACTIVE PAGE LOCATIONS BY POINTING A LIGHT BEAM USING A HANDHELD DEVICE

(71) Applicant: Kibeam Learning, Inc., Oakland, CA (US)

(72) Inventors: Lewis James Marggraff, Lafayette, CA (US); Nelson George Publicover, Bellingham, WA (US)

(73) Assignee: KIBEAM LEARNING, INC., Oakland, CA (US)

( * ) Notice: Subject to any disclaimer, the term of this patent is extended or adjusted under 35 U.S.C. 154(b) by 0 days.

(21) Appl. No.: 18/382,456

(22) Filed: Oct. 20, 2023

(65) Prior Publication Data

US 2024/0257658 A1 Aug. 1, 2024

Related U.S. Application Data

(63) Continuation-in-part of application No. 18/220,738, filed on Jul. 11, 2023, now Pat. No. 11,989,357.

(60) Provisional application No. 63/441,731, filed on Jan. 27, 2023.

(51) Int. Cl.
*G09B 5/04* (2006.01)

(52) U.S. Cl.
CPC ...................... *G09B 5/04* (2013.01)

(58) Field of Classification Search
CPC ...................................................... G09B 5/04
See application file for complete search history.

(56) References Cited

U.S. PATENT DOCUMENTS

| | | | | |
|---|---|---|---|---|
| 4,590,381 A * | 5/1986 | Mendelson | ............ | B43K 29/10 |
| | | | | 250/485.1 |
| 5,945,656 A * | 8/1999 | Lemelson | .......... | G06K 7/10881 |
| | | | | 235/472.01 |
| 6,787,378 B2 * | 9/2004 | Ishii | ................... | G01B 11/0608 |
| | | | | 702/155 |
| 7,249,431 B1 * | 7/2007 | Rose | ....................... | G09F 13/20 |
| | | | | 250/483.1 |

(Continued)

FOREIGN PATENT DOCUMENTS

JP 2001-125738 * 5/2001

*Primary Examiner* — Jay Trent Liddle
*Assistant Examiner* — Alyssa N Brandley
(74) *Attorney, Agent, or Firm* — William A. English; Vista IP Law Group LLP

(57) ABSTRACT

Systems and methods are described in which a light beam generated by a handheld device is used to point toward a selected object or location within a printed page containing visual content. The object(s) and/or location being pointed at may be determined using a device camera pointed in the same direction as the beam coupled with computer vision methods to determine locations of camera-acquired images within a database of page-content templates. The database may include interactive sequences and/or scenarios associated with page objects and locations, which may augment the visual content of a printed book to include audible elements, additional visual components, and/or haptic stimulation enacted by the handheld device. The device may also generate a beam image reflection on a viewable surface that is in focus at a predetermined distance to encourage a user to position the handheld device at the predetermined distance from the viewable surface.

20 Claims, 11 Drawing Sheets

(56) References Cited

U.S. PATENT DOCUMENTS

| | | | | |
|---|---|---|---|---|
| 8,737,908 | B1* | 5/2014 | Smith | G09B 5/062 |
| | | | | 434/317 |
| 10,971,033 | B2* | 4/2021 | Conard | H04N 23/959 |
| 2004/0029086 | A1* | 2/2004 | Burg | G09B 19/0038 |
| | | | | 434/379 |
| 2004/0124359 | A1* | 7/2004 | Hamrelius | H04N 23/635 |
| | | | | 250/341.7 |
| 2008/0260210 | A1* | 10/2008 | Kobeli | G06V 20/62 |
| | | | | 382/114 |
| 2009/0195656 | A1* | 8/2009 | Zhou | G09B 19/00 |
| | | | | 704/235 |
| 2013/0050482 | A1* | 2/2013 | Choi | G09B 5/04 |
| | | | | 348/143 |
| 2013/0201162 | A1* | 8/2013 | Cavilia | G06F 3/03545 |
| | | | | 345/179 |
| 2022/0065650 | A1* | 3/2022 | Shlomot | G01C 21/12 |

* cited by examiner

SYSTEMS AND METHODS TO SPECIFY INTERACTIVE PAGE LOCATIONS BY POINTING A LIGHT BEAM USING A HANDHELD DEVICE

RELATED APPLICATION DATA

The present application claims benefit of provisional application Ser. No. 63/441,731, filed Jan. 27, 2023, and is a continuation-in-part of co-pending application Ser. No. 18/220,738, filed Jul. 11, 2023, the entire disclosures of which are expressly incorporated by reference herein.

TECHNICAL FIELD

The present application relates generally to systems and methods for an individual to identify a displayed object or location within a page (e.g., of a book) using a light beam projected from a handheld electronic device. Although the handheld device may be used by anyone, it may be particularly well-suited for use by a young child or learner, utilizing simple interactive signaling that lacks requirements for precision manual dexterity and/or understanding screen-based interactive sequences. Systems and methods herein employ techniques within the fields of mechanical design, electronic design, firmware design, computer programming, optics, computer vision (CV), ergonometric (including child safe) construction, human motor control and human-machine interaction. Systems and methods may provide a user, especially a child or learner, with a familiar machine interface to instinctively and/or confidently indicate a location within a book or other display of printed content.

BACKGROUND

In recent years, the world has become increasingly reliant on portable electronic devices that have become more powerful, sophisticated and useful to a wide range of users. However, although children may rapidly embrace using some aspects of electronics designed for more experienced users, young children may benefit from having access to interactive electronic devices that are small, light-weight, colorful, playful, informative, ergonomically designed for children (including being child safe), and easy to use. The systems and methods disclosed herein make use of advances in the fields of optics that include visible light (i.e., frequently referred to as "laser") pointers, mobile sound and/or vibration generation (employing miniature coils, piezoelectric elements and/or haptic units), portable displays, inertial measurement units (sometimes also referred to as inertial motion units), and telecommunications.

The beam of a visible light pointer (also referred to as a "laser pen"), typically used within business and educational environments, is often generated by a lasing diode with undoped intrinsic (I) semiconductor between p (P) and n (N) type semiconductor regions (i.e., a PIN diode). Within prescribed power levels and when properly operated, such coherent and collimated light sources are generally considered safe. Additionally, if directed at an eye, the corneal reflex (also known as the blink or eyelid reflex) ensures an involuntary aversion to bright light (and foreign bodies).

However, further eye safety may be attained using a non-coherent, light-emitting diode (LED) source. Such non-coherent sources (so-called "point-source" LEDs) may be collimated using precision (e.g., including so-called "pre-collimating") optics to produce a light beam with minimal and/or controlled divergence. Point-source LEDs may, if desired, also generate a beam composed of a range of spectral frequencies (i.e., compared with the predominantly monochromatic light produced by a single laser).

Speakers associated with televisions, theaters and other stationary venues generally employ one or more electromagnetic moving coils. Within handheld and/or mobile devices, the vibrations of a miniature speaker may be produced using similar electromagnetic coil approaches and/or piezoelectric (sometimes referred to as "buzzer") designs. Vibrations (e.g., particularly those associated with alerts) may also be generated by a haptic unit (also known as kinesthetic communication). Haptic units generally employ an eccentric (i.e., unbalanced) rotating mass or piezoelectric actuator to produce vibrations (particularly at the low end of the audio spectrum) that can be heard and/or felt.

Visual displays or indicators may be composed of any number of monochromatic or multi-colored, addressable light-sources or pixels. Displays may range from a single light source (e.g., illuminating an orb, transmitted via a waveguide), to those that are capable of displaying a single number (e.g., seven-segment display) or alphanumeric character (e.g., a five-pixel by eight-pixel array), to high-resolution screens with tens of millions of pixels. Regardless of scale, displays are typically implemented as: 1) a two-dimensional array of light sources (most frequently some form of light-emitting diodes (LEDs) including organic LEDs (OLEDs), or 2) two plates of polarized glass that sandwich liquid crystal material (i.e., forming a liquid crystal display, LCD) that responds to an electric current to allow different wavelengths of light from one or more illumination sources (i.e., a backlight) to pass.

Inertial measurement unit (IMU), accelerometer and/or magnetometer tracking may incorporate any or all combinations of: 1) linear accelerometers measuring forces generated during movement (i.e., governed by Newton's second law of motion) in up to three axes or dimensions, 2) gyroscope-based sensing of rotational rates or velocities in up to three rotational axes, 3) magnetometers measuring magnetic field (i.e., magnetic dipole moment) including fields generated by the earth, and/or 4) the gravitational pull of the earth (including gravitational orientation) by measuring forces on an internal mass.

Advances in both electronics (i.e., hardware), standardized communications protocols and allocation of dedicated frequencies within the electromagnetic spectrum have led to the development of a wide array of portable devices with abilities to wirelessly communicate with other, nearby devices as well as large-scale communications systems including the World Wide Web and the metaverse. Considerations for which protocols (or combinations of available protocols) to employ within such portable devices include power consumption, communication range (e.g., from a few centimeters to hundreds of meters and beyond), and available bandwidth.

Currently, Wi-Fi (e.g., based on the IEEE 802.11 family of standards) and Bluetooth (managed by the Bluetooth Special Interest Group) are used within many portable devices. Less common and/or older communications protocols within portable devices in household settings include Zigbee, Zwave, and cellular- or mobile phone-based networks. In general (i.e., with many exceptions, particularly considering newer standards), compared with Bluetooth, Wi-Fi offers a greater range, greater bandwidth and a more direct pathway to the internet. On the other hand, Bluetooth, including Bluetooth Low Energy (BLE), offers lower power, a shorter operational range (that may be advantageous in some applications), and less complex circuitry to support communications.

Advances in miniaturization, reduced power consumption and increased sophistication of electronics, including those applied to displays, micro-electromechanical systems (MEMS) including inertial measurement units (IMUs), and telecommunications have revolutionized the mobile device industry. Such portable devices have become increasingly sophisticated, allowing users to concurrently communicate, interact, geolocate, monitor exercise, track health, be warned of hazards, capture videos, perform financial transactions, and so on. Systems and methods that facilitate simple and intuitive interactions with a handheld pointing device may be useful.

SUMMARY

In view of the foregoing, systems and methods are provided herein that describe a light-weight, simple-to-use and intuitive handheld device that may be particularly well-suited for machine-based interactions by a child or other learner. Although the device may, in part, be accepted as a toy or "friend", the computational flexibility embedded within the device may allow it to be used as a means for embodied learning, emotional support, cognitive development, facilitating communication, expressing creativity, play, developing mindfulness and/or enhancing imagination.

The handheld device may, for example, aid in areas related to basic reading, literacy, dialogic reading. CROWD (i.e., Completion, Recall, Open-ended, WH-prompt [where, when, why, what, who], and Distancing) questioning, mathematics, and understanding of science and technology. Additionally, the device may help traverse a learner's Zone of Proximal Development (i.e., difference between what a learner can do without help versus what can be achieved with guidance, ZPD) by providing omnipresent (machine-based) educational support and/or guidance. Turning the contents of a page (e.g., within a book or magazine) into a visual, aural and/or haptic experience may significantly aid in the acquisition of new knowledge, skills and memories. Furthermore, a portable, light-weight, "fun" handheld device may motivate physical movement by a child (and adults) including kinetic and kinesthetic activities.

According to one aspect, systems and methods are provided for an individual to select an object or location within the viewable content of a page of, for example, a book or magazine. As described in greater detail in the Detailed Description below, within descriptions herein, the term "page" refers to any substantially two-dimensional surface capable of displaying viewable content. Page content may include any combinations of text, symbols, drawings and/or images; and may be displayed in color, shades of gray, or black-and-white.

An individual may use a light beam emanating from a handheld device to select (i.e., point at, identify, and/or indicate) an object and/or location within the page. A camera within the handheld device, and pointed in the same direction as the light beam, may acquire an image of the region of a page being pointed at. The image may include a reflection of the light beam (e.g., containing incident light reflected off the page), or the beam may be turned off (e.g., momentarily) while images are being acquired (e.g., allowing page content to be imaged absent interference by light beam reflections).

In either case, the location of the light beam within a camera-acquired image may be known based on the camera and beam being co-located closely together (and moving together) within the body of the handheld device and pointed in the same direction. Beam locations within camera-acquired images may, for example, be computed based on the geometry of beam pointing and camera imaging, and/or calibration processes to empirically identify locations of beam reflections within camera-acquired images.

Selections by the handheld device user may be signaled using any of a variety of indicating methods employing one or more handheld device sensing elements. Selections (and optionally control of the light beam, such as turning on or off) may be indicated using a device switch such as a pushbutton, contact switch or proximity sensor. Alternatively, keywords, phrases or sounds produced by a user and sensed by a device microphone, may be identified to indicate selections (and beam control).

Alternatively, or in addition, user control of orientation and/or movement of the handheld device (e.g., movement gesture, striking the handheld device, tapping the handheld device against another object) sensed by an embedded IMU may be used to indicate a selection. Within signaling mechanisms that produce movement of the handheld device, a camera-acquired image captured just prior to any movement may be used during processes to identify a selected object and/or location within a page.

Within further aspects of the systems and methods, the processor within the handheld device may acquire predetermined interactive page layouts (that may include one or more object templates) of collections of pages (e.g., books, magazines) that an individual might view. Using computer vision (CV) methods (e.g., neural networks, machine learning, transformers, generative artificial intelligence (AI), and/or template matching), a match may be determined between a camera-acquired image and a page layout, or one or more object templates. CV-based matching may identify both a page (e.g., within a book or magazine) being viewed by the device user as well as a location, object, word, or target within the page being pointed at by the light beam.

Optionally, page and content selections may be performed in two stages in which a contextual object (e.g., book cover, title, word or phrase, printed object, drawing, real-world object) may first be selected to assign a "context" (e.g., particular book or book chapter, type of book or magazine, topic area, skill requirement) for subsequent selections. Page layouts including object templates only related to the identified context are then considered for CV-based matching with camera-acquired images.

Compared with global classification methods to identify objects within images, CV and/or AI methods based on matching camera-acquired images to a finite set of predetermined page layouts and/or object templates may reduce required computing resources (e.g., on a portable, handheld device) and facilitate greater accuracy when identifying content being pointed at using the light beam.

Predetermined interactive page layouts may contain (or point to additional datasets containing) interactive actions and/or additional content that may be enacted as a result of selecting an object, location, or region within a page. Examples of such interactive actions include word pronunciations, sound effects, displaying the spelling of an object (e.g., not shown as text), broadcasting phonetic elements of a selected object, additional story content, questions about page content, rhythmic features related to a selected object (e.g., that may form a basis for haptic or vibrational stimulation of the hand of the device user), rewarding or consoling audible feedback upon making a particular selection, related additional or sequential content, and so on.

Based on interactive content within the predetermined interactive page layout database, one or more visual, acoustic and/or haptic actions may be performed on the handheld device itself. Alternatively, or in addition, selections, attributes and the timing of selections may be conveyed to one or more external processors that may, in turn, log interactions (e.g., for education and/or parental monitoring) and/or perform additional and/or complementary interactions involving the handheld device user. Automated record-keeping of reading engagement, content, progression, and/or comprehension (e.g., including comparisons with other children at a similar age) may provide insight about a child's emotional and cognitive development.

Taken together, upon pointing a light beam toward an object or location within a page, interactions facilitated by a handheld device may help to bring printed or displayed content "to life" by adding audible elements, additional visual components, and/or haptic stimulation felt by a hand of a handheld device user. Augmenting printed content with interactive sequences including real-time feedback related to content may not only provide omnipresent, machine-based guidance while reading, but also be "fun" and/or help maintain emotional engagement (without being overwhelming) within a learning environment.

In accordance with an example, a method is provided to perform an action based on a specified page location selected by a human using a handheld device including a device processor, a device light source configured to generate a projected light beam producing one or more light reflections off one or more visible objects viewable by the human, and a device camera aligned such that a camera field-of-view includes a reflection location of the one or more light beam reflections and is operatively coupled to the device processor, the method comprising: acquiring, by the device processor, one or more predetermined interactive page layouts; acquiring, by the device camera, a camera image when the handheld device is manipulated such that the projected light beam points from the device light source toward the specified page location; computing, by the device processor, a positioned image based on a match of the camera image to the one or more predetermined interactive page layouts; identifying, by the device processor, the specified page location based on the reflection location within the positioned image; and performing the action by one or both of the device processor and a remotely connected processor, based at least in part on the specified page location within the one or more predetermined interactive page layouts.

In accordance with another example, a method is provided to perform an action based on a specified page location within an identified context selected by a human using a handheld device including a device processor, a device light source configured to generate a projected light beam producing one or more light reflections off one or more visible objects viewable by the human, and a device camera aligned such that a camera field-of-view includes a reflection location of the one or more light reflections and is operatively coupled to the device processor, the method comprising: acquiring, by the device processor, one or more predetermined contextual templates; acquiring, by the device camera, a first camera image when the handheld device is manipulated such that the projected light beam points from the device light source toward a contextual object; computing, by the device processor, the identified context based on a match of the first camera image to the one or more predetermined contextual templates; acquiring, by the device processor, one or more predetermined interactive page layouts associated with the identified context; acquiring, by the device camera, a second camera image when the handheld device is manipulated such that a projected light beam points from the device light source toward the specified page location; computing, by the device processor, a positioned image based on a match of the second camera image to the one or more predetermined interactive page layouts; identifying, by the device processor, the specified page location based on the reflection location within positioned image; and performing the action, by one or both of the device processor and a remotely connected processor, based at least in part on the specified page location within the one or more predetermined interactive page layouts.

In accordance with a further example, a method is provided to perform an action based on a specified page location selected by a human using a handheld device including a device processor, a device light source configured to generate a projected light beam producing one or more light beam reflections off one or more visible objects viewable by the human, and a device camera aligned such that a camera field-of-view includes a reflection location of the one or more light reflections and is operatively coupled to the device processor, the method comprising: acquiring, by the device processor, one or more predetermined interactive page layouts; acquiring, by the device camera, two or more camera images when the handheld device is manipulated such that the projected light beam points from the device light source toward the specified page location; determining, by the device processor, that an image movement measured in the two or more camera images is less than a predetermined movement threshold and the two or more camera images were acquired over an acquisition time greater than a predetermined dwell time threshold; computing, by the device processor, a positioned image based on a match of the camera image to the one or more predetermined interactive page layouts; identifying, by the device processor, the specified page location based on the reflection location within the positioned image; and performing the action by one or both of the device processor and a remotely connected processor, based at least in part on the specified page location within the one or more predetermined interactive page layouts.

In accordance with yet a further example, a method is provided to perform an action based on a specified page location selected by a human using a handheld device including a device processor, a device light source configured to generate a light beam producing one or more light reflections off one or more visible objects viewable by the human, a device camera aligned such that a camera field-of-view includes a reflection location of the one or more light reflections and is operatively coupled to the device processor, and a device switch operatively coupled to the device processor, the method comprising: acquiring, by the device processor, one or more predetermined interactive page layouts; determining, by the device processor, that the device switch is in a first state; determining, by the device processor, that the device switch is in a second state when the handheld device is manipulated such that the projected light beam points from the device light source toward the specified page location; acquiring, by the device camera, a camera image; computing, by the device processor, a positioned image based on a match of the camera image to the one or more predetermined interactive page layouts; identifying, by the device processor, the specified page location based on the reflection location within the positioned image; and performing the action by one or both of the device processor and a remotely connected processor, based at least in part on the specified page location within the one or more predetermined interactive page layouts.

In accordance with yet another example, a method is provided to perform an action based on a specified page location selected by a human using a handheld device including a device processor, a device light source configured to generate a light beam producing one or more light reflections off one or more visible objects viewable by the human, a device camera aligned such that a camera field-of-view includes a reflection location of the one or more light reflections and is operatively coupled to the device processor, and a device switch operatively coupled to the device processor, the method comprising: acquiring, by the device processor, one or more predetermined interactive page layouts; determining, by the device processor, that the device switch is in a first state; acquiring, by the device camera, one or more camera images when the handheld device is manipulated such that a projected light beam points from the light source toward the specified page location; determining, by the device processor, that the device switch is in a second state; isolating, by the device processor, a most recent stable camera image from the one or more camera images; computing, by the device processor, a positioned image based on a match of the most recent stable camera image to the one or more predetermined interactive page layouts; identifying, by the device processor, the specified page location based on a predetermined beam pointing location within the positioned image; and performing the action by one or both of the device processor and a remotely connected processor, based at least in part on the specified page location within the one or more predetermined interactive page layouts.

In accordance with an example, a handheld device is provided comprising: a device body configured to be manipulated by a hand of a device user; electronic circuitry within the device body that includes a device processor; a device light beam source configured to emanate a light beam away from the device body to generate a beam image reflection on a viewable surface, in focus at a predetermined distance from the viewable surface; and a device camera operatively coupled to the device processor and aligned such that a field-of-view of the device camera includes the beam image reflection, wherein the handheld device is configured to: generate the beam image reflection on the viewable surface that is in focus at the predetermined distance to encourage the device user to position the handheld device at the predetermined distance from the viewable surface; and acquire a camera image.

In accordance with another example, a method is provided to encourage a device user to position a handheld device a predetermined distance from a viewable surface, wherein the handheld device comprises a device body configured to be manipulated by a hand of the device user; electronic circuitry within the device body that includes a device processor; a device light beam source configured to generate a beam image reflection, in focus at the predetermined distance; and a device camera operatively coupled to the device processor and aligned such that the device camera field-of-view includes the beam image reflection, the method comprising: generating, by the device light beam source, the beam image reflection on the viewable surface that is in focus at the predetermined distance to encourage the device user to position the handheld device at the predetermined distance from the viewable surface; and acquiring, by the device camera, a camera image.

In accordance with a further example, a method is provided to encourage a device user to position a handheld device a predetermined distance from a viewable surface, wherein the handheld device comprises a device body configured to be manipulated by a hand of the device user; electronic circuitry within the device body that includes a device processor; a device light beam source configured to generate a beam image reflection on the viewable surface; one or more moveable reflective surfaces within a device beam light path originating from the device light beam source, each operatively coupled to the device processor; and a device camera operatively coupled to the device processor and aligned such that the device camera field-of-view includes the beam image reflection, the method comprising: generating, by the device light beam source, the beam image reflection on the viewable surface; moving, by the device processor, the one or more moveable reflective surfaces to make the beam image reflection in focus at the predetermined distance to encourage the device user to position the handheld device at the predetermined distance from the viewable surface; and acquiring, by the device camera, a camera image.

Other aspects and features including the need for and use of the present invention will become apparent from consideration of the following description taken in conjunction with the accompanying drawings.

BRIEF DESCRIPTION OF THE DRAWINGS

A more complete understanding may be derived by referring to the Detailed Description when considered in connection with the following illustrative figures. In the figures, like-reference numbers refer to like-elements or acts throughout the figures. Presented examples are illustrated in the accompanying drawings, in which.

DETAILED DESCRIPTION

Figure 1:
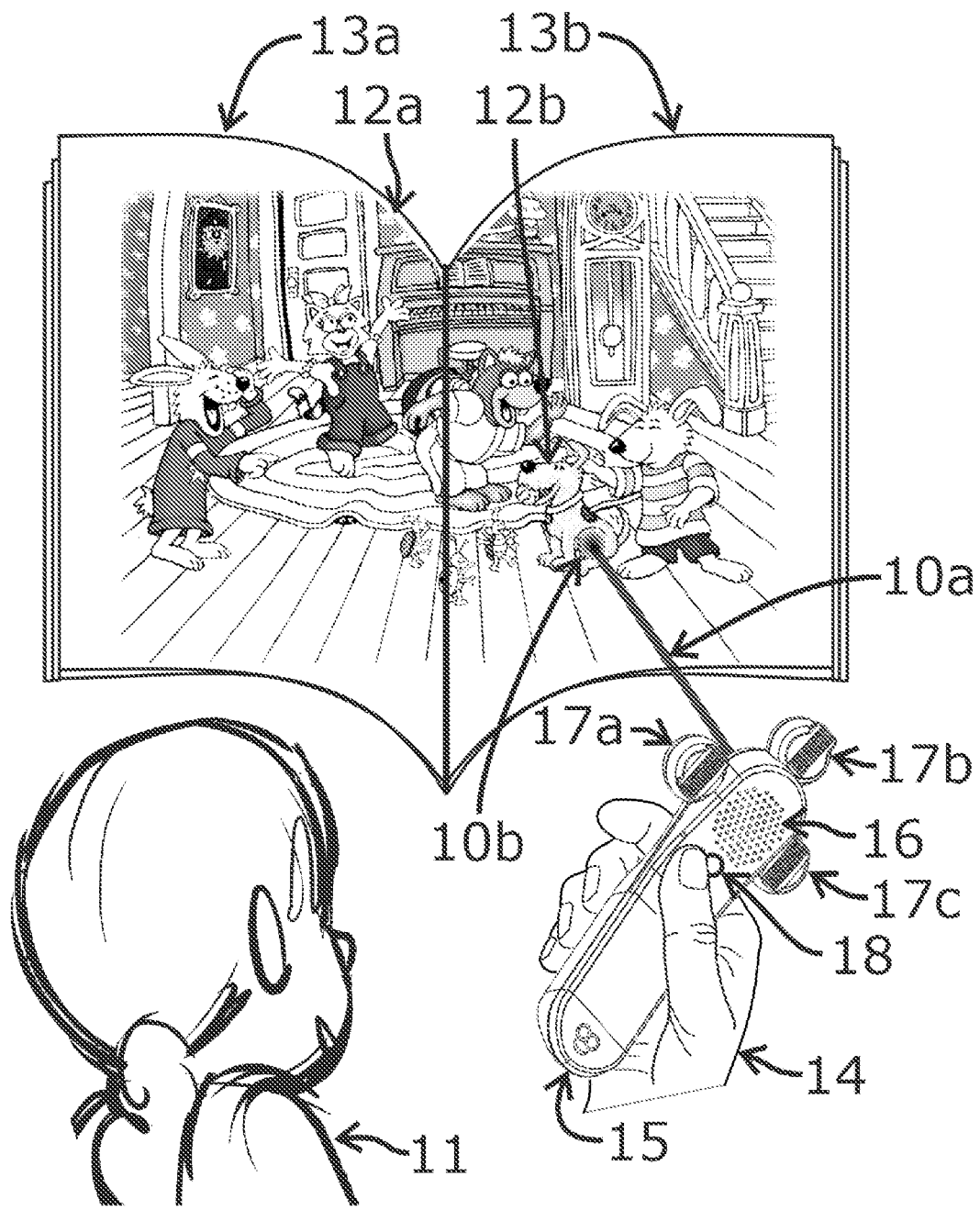
FIG. 1 illustrates exemplary manipulation of a handheld device by a child to identify and select a dog within a scene from a book of drawings (that includes several additional characters and objects) by pointing a light beam emanating from the device toward the canine form.

Before the examples are described, it is to be understood that the invention is not limited to particular examples described herein, as such may, of course, vary. It is also to be understood that the terminology used herein is for the purpose of describing particular examples only, and is not intended to be limiting, since the scope of the present invention will be limited only by the appended claims.

Unless defined otherwise, all technical and scientific terms used herein have the same meaning as commonly understood by one of ordinary skill in the art. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

According to one aspect, systems and methods are provided for an individual to select (point at, identify, and/or indicate) a location or object (e.g., from a plurality of viewable objects) within the visual contents of a page of a book, and subsequently to interact with page contents based on selections made using a handheld device. Within descriptions herein, the term "page" refers to any substantially two-dimensional surface capable of displaying viewable content. Pages may be constructed of one or more materials including paper, cardboard, film, cloth, wood, plastic, glass, a painted surface, a printed surface, a textured surface, a surface enhanced with three-dimensional elements, a flexible surface, an electronic display, and so on.

Along similar lines, the term "book" is used herein to refer to any collection of one or more pages. A book may include printed materials such as a traditional (e.g., bound) book, magazine, brochure, newspaper, handwritten notes and/or drawings, book cover, chapter, tattoo, box, sign, poster, scrapbook, collection of photographs or drawings, and so on. Pages may also be displayed on an electronic screen such as a tablet, electronic reader, television, light projection surface, mobile phone or other screen-based device.

Page content is limited only by the imagination of the author(s). Typically, for example, a children's book may contain a combination of text and drawings. More generally, page content may include any combination of text, symbols (e.g., including the range of symbols available in different languages), logos, specifications, drawings and/or images; and may be displayed in color, shades of gray, or black-and-white. Content may portray real or fictional scenarios, or mixed combinations of both.

According to further aspects, devices, systems and methods are provided in which one or more predetermined page layouts that may include one or more page object templates are known to one or more processors, including a handheld device processor. The handheld device user may point to a location within a selected (i.e., by the user) page using a light beam generated by the device. As described in greater detail below, beams may be produced using a lasing diode or a light-emitting diode (LED) with beam-forming optics.

A camera within the handheld device, and pointed in the same direction as the light beam, may acquire one or more images of a location or region within a page being pointed at by the handheld device user. When the beam is turned on, and as long as a surface is sufficiently reflective, a camera-acquired image may include a reflection of the light beam (e.g., containing incident light reflected off the page).

Alternatively, the beam may be turned off as images are being acquired. Turning the beam off (e.g., at least momentarily during camera-based image acquisition) allows page contents to be processed (e.g., using CV methods) absent interference by light beam reflections. Even while the beam is turned off, because both the beam and camera move at the same time (i.e., affixed to, or embedded within, the handheld device body), the location or region a beam is pointed toward within a camera image may be known regardless of the physical position, pointing direction, or overall orientation of the handheld device in (three-dimensional) space.

Construction of the handheld device may strive to place the beam reflection at the center of camera images. However, given a small separation (e.g., as a result of physical construction constraints, for example as shown in FIG. 6) between the beam source and the camera sensor, the beam may not appear at the center of camera images at all working distances.

The pointing directions of a beam and camera field-of-view may be aligned to converge at a preferred working distance. In this case, the beam may be made to appear approximately at the center of camera images (or some other selected camera image location) over a range of working distances. In this configuration, as the distance from the handheld device to a reflective surface varies, the location of the beam may vary over a limited range (generally, in one dimension along an axis in the image plane in a direction defined by a line passing through the center of the camera field-of-view and the center of the light beam source).

Figure 6:
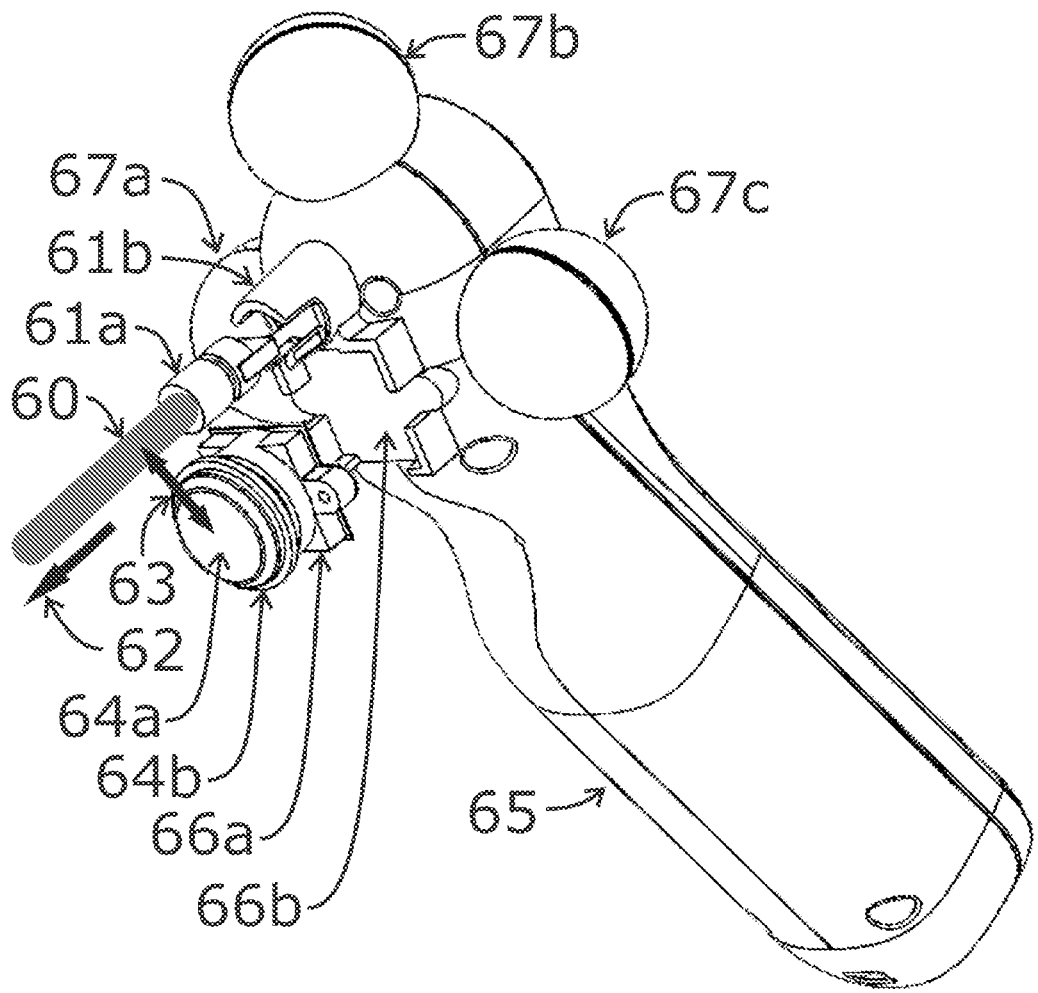
FIG. 6 is an exploded-view drawing of an exemplary handheld device showing locations, pointing directions, and relative sizes of a light beam source and camera.

At a particular working distance (i.e., from the handheld device to a reflective surface), a location of a reflection may be computed using geometry (analogous to the geometry describing parallax) given the direction of beam pointing, the direction of camera image acquisition and the physical separation between the two (see, e.g., FIG. 6). By keeping the physical separation between the beam and camera small, a beam pointing region within camera images may be kept small over a range of working distances employed during typical applications.

Alternatively, the beam and camera may be aligned to project and acquire light rays that are parallel (i.e., non-converging). In this case, a reflection may be offset from the center of the camera's field-of-view by an amount that varies with working distance. The separation between the center of camera images and the center of the beam decreases as working distances increase (e.g., approaching a zero distance at infinity). By keeping the physical distance separating the beam and camera small, the separation may similarly be kept small.

Regardless of alignment configuration, the location of a light beam within a camera-acquired image (including when the beam is turned off) may be known based on the camera and beam being co-located within the body of the handheld device, pointed in the same direction and moved together. Beam locations within camera-acquired images may be computed based on the separation and pointing geometry of the beam and camera, and/or determined empirically via a calibration process (e.g., prior to deployment), for example, using the following steps:

1) acquire a baseline image (e.g., from a featureless surface) that includes no reflection by the projected light beam;
2) acquire a light beam reflection image that includes one or more reflections produced by the projected light beam;
3) compute a subtracted pixel intensity image based on the baseline image subtracted from the light beam reflection image; and
4) compute a beam pointing location based on pixels within the subtracted pixel intensity image that exceed a predetermined light intensity threshold.

A beam pointing region may be identified based on locations of pixels that exceed the intensity threshold, and/or a singular beam pointing location may be determined from a computed central location of pixels that exceed the threshold intensity (e.g., two-dimensional median, average, center of a beam spread function fit to the intensity profile). Calibrations may be performed at different working distances to map the full extent of a beam pointing region.

Within additional examples herein, identifying an object or location being pointed at within camera-acquired images may, with the beam turned on, be based on identifying a beam reflection as a region of high luminosity (e.g., high intensity within a region of pixel locations). Identifying the location of such beam reflections may also take into account the color of the light beam (i.e., identifying higher intensities only within one or more colors associated with the light beam spectrum). Knowing the relation between pointing location and working distance additionally allows an estimate of the distance from the handheld device to a reflective surface to be computed when camera-acquired images with beam reflections are available.

Within further examples, based on the spectral sensitivity of a typical human eye, a light beam in the green portion of the visible spectrum may be most readily sensed by most individuals. Many so-called RGB (i.e., red, green, blue) cameras contain twice as many green sensor elements as red or blue elements. Utilizing a light beam in the mid-range of the visible spectrum (e.g., green) may allow beam intensity to be kept low but readily detectable (e.g., by both humans and cameras), improving the reliability of detecting reflections within camera-based images and increasing overall eye safety According to further aspects of the devices, systems and methods herein, predetermined interactive page layouts may include object templates, object locations, object orientations, page specifications, text or symbol formats, and/or additional attributes of visual properties associated with page content. Using CV methods (e.g., template matching, neural network classification, machine learning, transformer models) based on matching one or more camera-acquired images with a predetermined page layout or object template, the position of the image within the page layout may be determined. As a result of such positioning, the handheld device processor may identify a selected (i.e., pointed toward by the light beam) location, region and/or object within a page.

Within descriptions herein, the term "position" (and related terms such as "positioning") is generally used to describe processes related to identifying a match between a camera acquired image and an interactive page layout. As described in greater detail below, positioning processes may include determining a number of measures such as a horizontal and vertical reference (e.g., corner) position (x,y), orientation (θ), and a magnification (m) of a camera-acquired image within the page layout. Along similar lines, the term "locate" (and related terms such as "location") is generally used when describing processes related to identifying a location of the light beam within a camera image (and thus within a page layout, once camera images are positioned within the layout), and/or the location of an object within a page.

Within a page layout, object templates and/or attributes may, for example, include locations of objects or object elements as well as object shapes, sizes, profiles, patterns, colors, and/or textures. These may be stored in a variety of formats including bitmap, vector-based, scalable architecture, portable image, object element measurements, two- or three-dimensional computer-aided design (CAD) datasets, text-based descriptions and/or specifications, and so on.

Interactive page layout datasets of objects may additionally contain or point to a range of actions, properties and/or functions associated with each page location (or page region). As a result, an object or location being pointed at (and, optionally, any other viewable objects in the region within the camera image) may point to actionable datasets that may, for example, contain the sound an object makes, sounds associated with an object's function, pronunciations and/or phonetic elements of an object's name or description, the spelling of an object's name, and so on.

Additional examples of page location or object-associated datasets include audible or visually displayed prompts or nudges related to the beam pointing location, words or phrases that describe an object, questions and/or cues associated with one or more objects in the pointing region, displaying spelling(s) and/or phoneme(s) of a selected object, questions about a story related to the object or location, additional story content, rhythmic features related to a selected object (e.g., that may form a basis for haptic or vibrational stimulation of the hand of the device user), rewarding or consoling audible feedback upon making a particular selection, pointers to related additional or sequential content, actions performed if a selection is not performed within a predetermined time, and/or one or more actions (e.g., by the handheld device or by a remote processor) performed upon successfully selecting a page location or object as a component of an interactive sequence, as described in greater detail below.

Within further examples, page and content selections may be performed in two stages in which a "context" (e.g., particular book, type of book or magazine, topic area) may first be selected. As a result, page layouts and/or templates only related to the identified context may subsequently be considered for CV-based matching with camera-acquired images during the second stage (i.e., making a selection via beam pointing).

Predetermined contextual templates may include one or more book covers, magazine covers, book chapters, toys, persons, human anatomical elements, animals, pictures, drawings, words, phrases, household objects, classroom objects, tools, automobiles, clothing articles, and so on. As an example, pointing toward a book cover may result in the interactive page layouts of all pages of the identified book to be acquired and subsequently used to identify light beam-based selections. Contextual objects (i.e., being pointed at using a light beam to identify context) may be "virtual" (e.g., images of real objects printed on a page or displayed on a screen) or "real-world" objects (e.g., a cat or article of clothing in the environment of the device user).

In some cases, it may not be necessary to point (the light beam) toward a specific item within a camera-acquired image to assess context. For example, when pointing toward a book cover, the cover may be identified without, for example, pointing specifically toward one or more words in a book title or an author's name. CV methods may determine a match between an entire camera-acquired image or any portion of the image, and an entire contextual template or any portion of the contextual template. In other cases, such as when pointing toward a real-world object, a bounded region at a beam pointing region within a camera-acquired image may be considered when determining the presence of a match with a predetermined database of contextual object templates.

In addition to visual properties within an object template (as described above), each contextual template dataset may point to all (or a subset of) available interactive pages related to the contextual object, and/or provide applicable search terms or methods to identify such interactive page layouts. Once a context has been identified, only interactive page layouts related to the context may be considered during subsequent interactions until the end of a contextual sequence is signaled and/or another context is identified.

Signaling the end of a contextual sequence may arise from the device user indicating a desire to change topics, for example, via a movement gesture (sensed by an IMU), prolonged pause in motion or other expected response, verbal utterance (sensed by a microphone), or depressing or releasing a device pushbutton. Confining CV comparisons to contextual page layouts may similarly cease upon reaching the end of a story or other book element.

If a context selection (e.g., book cover) is not recognized using CV or other methods with images acquired by the handheld device camera, then the device may (e.g., automatically) query a central (e.g., remote) repository of predetermined contextual templates. If one or more contextual matches (e.g., using CV or other methods) are found within repository datasets, then the one or more contextual templates and associated datasets may be downloaded (e.g., automatically, wirelessly) to the handheld device, allowing contextual interactions to proceed. If no context match is found (e.g., as a result of imaging an image of a cover of an unknown book), then the context query may be placed within a database for future interactive book content to be developed.

Whether or not a contextual pointing step is included, CV and AI methods based on matching camera-acquired images to a finite set of page layouts, object templates, and/or contextual templates may significantly reduce required computing resources (e.g., compared with global classification methods). As an example, template matching may consider only page layouts related to the pages of books provided to a child. CV and AI methods that utilize (e.g., convolution) neural networks may be trained on, and only consider, the pages of such provided books.

Within further examples, network training (and other programming of handheld device CV and AI processes) may take advantage of a wide array of distributed machine learning resources (e.g., TensorFlow, SageMaker, Watson Studio). The restricted nature of comparing camera-acquired images with a layout or template database may greatly simplify training (and classification) processes to determine the presence, or not, of a match with a page layout and/or object template. Training of classification networks may be confined to a predetermined layout and/or template database (library of children's books), a data subset such as a particular collection of books or magazines, or even a single book or book chapter (e.g., when context is known).

Such confined datasets may also allow relatively simple classification networks and/or decision trees to be implemented. Optionally, classifications may be performed entirely on a handheld device (with confined computing resources) and/or without transmitting to remote devices (e.g., to access more substantial computing resources). Such classifications may be performed using neural network (or other CV and AI) approaches using hardware typically found on mobile devices. As examples, MobileNet and EfficientNet Lite are platforms designed for mobile devices that may have sufficient computational power to determine locations of camera-acquired images within book pages.

Classifications based on known (e.g., relatively small compared with global classification methods to identify any object) layout and/or template datasets may also facilitate greater accuracy when identifying content being pointed at using a light beam. Such confined classifications may be more robust because: 1) images are only being compared to a database of discoverable pages (e.g., not to all possible objects throughout the world), 2) training may be performed using the discoverable pages, and 3) CV match thresholds may be adjusted to help ensure the intents of device users are accurately reflected.

Thresholds for locating a camera-based image within a page may be adjusted based on factors such as hardware (e.g., camera resolution), environment (e.g., lighting, object size), a specific application (e.g., the presence of multiple objects similar in appearance), categories of users (e.g., younger versus older, experienced versus novice) or a particular user (e.g., considering prior successful object selection rates).

According to further aspects of the systems and methods herein, predetermined datasets of page layouts may include and/or point to datasets describing one or more actions to be performed by the handheld device and/or one or more connected processors during and/or following selections. Actions enacted on the handheld device itself may include playing one or more sounds on a device speaker, displaying one or more illumination patterns on one or more device displays, and/or activating a device haptic unit (in which device components may be operatively coupled to the device processor).

Steps to initiate actions on one or more external devices may include transmitting, to the one or more remote processors, interactive page layouts, any contextual and/or object templates, any or all camera images (particularly images used during object selection), acquisition times when camera images were acquired, positioned images (e.g., determined position, orientation and magnification parameters), beam pointing locations, specified object(s) and/or location(s) within page layouts, one or more actions within the page layout dataset, and feedback elements produced by the handheld device. A lack of making any selection within a prescribed time or indicating a selection that does not produce a match with any acquired template may also be conveyed to an external processor.

When dwell is used to indicate or identify when a location is being specified by a device user (see below), additional dwell thresholds and measurements may be included within transmitted data including the two or more camera images used to measure movement, measured image movement, IMU-based measurements of movement (e.g., gesture or tap), and/or predetermined dwell amplitude and/or time thresholds. Data related to other signaling mechanisms used to identify when a selection is being made by the device user may also be transmitted including voice or audio indication(s) by the device user (e.g., sensed by a device microphone), the timing and identification of device switch (or other handheld device sensor) activation or release, and so on.

Interactions facilitated by a handheld device may help to bring printed or displayed content "to life" by adding audio, additional visual elements, and/or vibrational stimulation felt by a hand (or other body part) of a handheld device user. Printed content augmented with real-time interactive sequences including feedback related to content may not only provide machine-based guidance while reading, but also be "fun", helping to maintain emotional engagement particularly while reading by, and/or to, a child. For example, the reading of a book may be augmented by adding queries, questions (for a parent or guardian, and/or the child), additional related information, sounds, sound effects, audiovisual presentations of related objects, real-time feedback following discoveries, and so on.

Interactions with objects in books may be a shared experience with a parent, friend, guardian or teacher. Using a handheld device to control the delivery of serial content is more fully described in co-pending U.S. application Ser. No. 18/091,274, filed Dec. 29, 2022, the entire disclosure of which is expressly incorporated herein by reference. Sharing the control of advancing to a new page or panel to select objects when viewing a book or magazine is more fully described in U.S. Pat. No. 11,652,654, filed Nov. 22, 2021, the entire disclosure of which is expressly incorporated herein by reference.

As mentioned in the Summary, a parent, peer, guardian or teacher may aid in transitioning through a learner's Zone of Proximal Development (ZPD). The ZPD is a framework in educational psychology that separates what a learner can do unaided versus what a learner can do with guidance (additionally versus what a learner cannot do, even with guidance). Making a book interactive, particularly a book that challenges a learner, may provide always-available support and guidance to transition through a ZPD in different topic areas, absent a human (e.g., teacher, family, peer member).

An omnipresent tool for such support and guidance may not only reduce needs for an individual with adequate literacy and/or skills to be present, but also allow for machine-based transitioning through the ZPD to occur at a time, place, comfortable environment and rate of a learner's choosing. Further, a personalized device (e.g., in appearance, verbal dialect, knowledge level based on a learner's individual background) that appears tireless and that has been used previously (e.g., with repeated rewarding feedback) may further aid in a learner acceptance, independence, self-motivation and confidence using the handheld device. Maintaining a challenging environment by bringing books to life may avoid boredom and/or loss of interest (and additionally, at an interactive rate that may avoid becoming overwhelmed).

According to further aspects, optionally, the handheld device and/or a remote processor may simultaneously perform ongoing, real-time assessments of engagement, language skills, reading abilities and/or comprehension. Assessment metrics may, for example, include the measured times a child spends interacting, success rates in discovering objects based on queries (particularly within different topic areas including areas of identified interest such as sports, science or art), times required to make pointing-based selections (e.g., often related to attention and/or interest), rates of overall progression when "discovering" new objects within the pages of serial content such as a book or magazine, and so on.

Such assessments may be compared with prior interactions by the same individual (e.g., to determine progress in particular topic areas), interactions using the same or similar interactive sequences by others (e.g., at the same age, cultural environment or educational level), and/or performance among different groups (e.g., comparing geographic, economic and/or social clusters).

Milestone responses demonstrating various aspects of cognitive processing (e.g., first indications involving distinguishing colors, differentiating phonemes and/or words, understanding numbers of objects, performing simple mathematical operations, gesture responses requiring controlled motor functions) may be particularly useful in monitoring childhood development, learning rates by older users, assessing if more challenging storylines might be presented, and/or enhancing engagement. Auditory, tactile and/or visual acuity may also be monitored by the handheld device in an ongoing manner.

The handheld device and/or external processors may log interactions (e.g., for education and/or parental monitoring). Automated record-keeping of interactions, reading engagement, content, progression, vocabulary acquisition, reading fluency, and/or comprehension (e.g., including compared with other children at a similar age) may provide insight about a child's emotional and cognitive development.

Within further examples herein, during the formation of handheld device interactions, attention may be paid to a range of individual considerations including age-appropriateness and/or educational level of the device user, an individual's hobbies and/or interests, the educational and/or entertainment value of page content, whether an object is anticipated as a next discovery within a serial sequence (e.g., storyline, alphabetical or numerical sequence), and so on. As an example, a children's book suitable for ages five through nine (i.e., early readers) typically contains text (generally up to 2,000 words) and drawings with light-hearted themes. A child may not only learn how to pronounce words but also recognize sounds typically associated with selected drawings. Optionally, such considerations may be known when formulating page layouts and interactive content.

Interactive components (e.g., acquired from page layout datasets) may be generated by the handheld device to initiate and/or guide interactions toward viewable objects (e.g., associations within a storyline, next object within a logical sequence, introduction of a new object and/or concept). Prompts may include AI-generated and/or scripted (i.e., pre-established) sequences including combinations of visual displays, audible sounds and/or haptic vibrations.

Scripted sequences may additionally include conditional dependencies (i.e., selects from two or more interaction scenarios) determined based on real-time conditions (e.g., success during prior selections, time of day, user age). Using the symbol "[prompt]" to represent one or more prompts or cues associated with an object, exemplary scripted prompts (presented visually, aurally and/or haptically) by the handheld device include:

```
Can you find the [prompt]?
Show me the largest [prompt].
What letter follows this displayed [prompt]?
What animal produces this sound [prompt]?
Which musical instrument produces the [prompt] beat you feel?
Who looks at the [prompt] on this page?
Find all the [prompt] within the page by pointing at each one.
```

Further, the handheld device processor may include a "personality" driven by AI (i.e., artificial intelligence personality, AIP), transformer models and/or large language models (e.g., ChatGPT, Cohere, GooseAI). An AIP instantiated within a handheld device may enhance user interactions by including a familiar appearance, interactive format, physical form, and/or voice that may additionally include personal insights (e.g., likes, dislikes, preferences) about the user.

Human-machine interactions enhanced by an AIP are more fully described in U.S. Pat. No. 10,915,814, filed Jun. 15, 2020, and U.S. Pat. No. 10,963,816, filed Oct. 23, 2020, the entire disclosures of which are expressly incorporated herein by reference. Determining context from audiovisual content and subsequently generating conversation by a virtual agent based on such context(s) are more fully described in U.S. Pat. No. 11,366,997, filed Apr. 17, 2021, the entire disclosure of which is expressly incorporated herein by reference.

Whether used in isolation or as a part of a larger system, a handheld device that is familiar to an individual (e.g., to a child) may be a particularly persuasive element of audible, haptic and/or visual rewards as a result of object selection (or, conversely, notifying a user that a selection may not be a correct storyline component). The handheld device may even be colored and/or decorated to be a child's unique possession. Along similar lines, audible feedback (voices, one or more languages, alert tones, overall volume), and/or visual feedback (letters, symbols, one or more languages, visual object sizing) may be pre-selected to suit the preferences, accommodations (e.g., hearing abilities), skills and/or other abilities of an individual user.

When used in isolation (e.g., while reading a book), interactions using a handheld device may eliminate requirements for accessories or other devices such as a computer screen, computer mouse, track ball, stylus, tablet or mobile device while making object selections and performing activities. Eliminating such accessories (often designed for an older or adult user) may additionally eliminate requirements by younger users to understand interactive sequences involving such devices or pointing mechanisms. When using the handheld device without a computer screen, interacting with images in books and/or objects in the real world (given the relative richness of such interactions that approaches that of screen-based interaction) may figuratively be described as using the device to "make the world your screen without a screen".

Feedback provided by the handheld device based on identifying a selected object or location within a page layout may be conveyed on a device speaker, one or more device displays and/or a haptic unit. Audible interactions or actions may include: sounds or sound effects typically produced by the selected object, sounds associated with descriptions of activities using the object, an enunciated name (including a proper name) of the object, a congratulatory phrase or sentence, a portion of a name or even a single letter (e.g., begins with a letter) associated with the object, a statement about the object and/or its function, a verbal description of one or more object attributes, a question about a function and/or object attributes, a musical score related to the object, a chime indication, a quotation or saying about the object, a verbal quiz in which the selected object (or the next object to be selected) is an answer, and so on.

Visual interactions or actions may include: displaying a name of the selected object or object category, an image or drawing of another object similar in appearance, an image of an object within a class or category of objects, an outline of the object, a caricature of the object, a portion of a word or letter (e.g., first letter) associated with a spelling of the object, one or more colors of the object (e.g., displaying a swatch with actual colors and/or one or more words that describe colors), a size of the object (e.g., particularly relative to other viewable objects), a statement or question about the object, a mathematical problem in which the (numeric or symbolic) object is a solution, an object next within a sequence of objects (e.g., a letter of an alphabet), a phrase in which the object is a missing element, and so on.

Haptic feedback during selections may comprise simply acknowledging success with a vibratory pattern, generating vibrations at a frequency associated with motions and/or sounds produced by the selected object, and so on. Haptic actions may also include vibrations that may be synchronous (or at least produced at similar frequencies) to motions or sounds typically generated by the selected object. As examples, haptic vibrations pulsing roughly once per second may be associated with pointing at an image of a heart, or producing a vibration and/or sound about every thirty to forty milliseconds for about ten to fifteen milliseconds each may emulate a cat purring while pointing at a cat.

Combinations of visual, audible and/or haptic actions may be generated by the handheld device and/or via a device operatively coupled to a remote processor. Combinations of actions may be produced simultaneously or as a closely timed sequence.

According to further aspects of the systems and methods herein, the light beam emanating by the handheld device may be generated using one or more lasing diodes, such as those manufactured by OSRAM and ROHM Semiconductor. Lasing diodes (and lasers in general) produce coherent, collimated and monochromatic sources of light.

Considering the portability of a handheld device in which a close-proximity light source may be pointed in any direction, increased eye safety (especially during use by a child, generally considered an "uncontrolled" environment from a safety perspective) may be attained using a non-coherent source such as a (non-lasing) light-emitting diode (LED). LED so-called point sources, such as those manufactured by Jenoptik and Marktech Optoelectronics may produce non-coherent, collimated and (optionally) polychromatic light sources.

Optical components associated with LED point sources may control beam divergence that, in turn, may guide reflected spot size (see, e.g., FIG. 5) at typical working distances (e.g., about 0.05 to 1.0 meters when the handheld device is used to point at objects within pages of a book or real-world object). Desirable spot sizes may differ during different application environments and/or during use by different users. For example, a young child may prefer pointing toward larger objects in close proximity to pages of a children's book, whereas an older child or adult may prefer to be able to point at objects as small as individual words or symbols on a page or screen (i.e., using a smaller and/or less divergent beam).

Within additional examples, wide spectrum (at least compared to a laser) and/or polychromatic light sources produced by (non-lasing) LEDs may help beam reflections to be seen by those who might be color-blind within a region of the visible spectrum. A polychromatic light source may also be viewed more consistently by all users when reflected off various surfaces. As an example, a purely green light source may not be seen easily when reflected off a purely red surface (e.g., region of a page). A polychromatic light source, especially in the red-green portion of the visible spectrum, may help alleviate such issues. More energetic photons within the deep blue end of the visible spectrum may be avoided for reasons related to eye safety.

Within further examples, the device beam source may be operatively coupled to the device processor, allowing the intensity of the beam source to be controlled, including turning the beam on and off. Turning the beam on by the handheld device may, for example, be used as a prompt to indicate that an object selection is expected (e.g., following an audible question).

Optionally, the beam may be turned off during times when camera images are acquired, for example, to avoid beam reflection(s), and/or pixel saturation at or near a reflection (e.g., as a result of pixels "bleeding" due to saturation). The absence of reflections off objects being pointed at (where reflections may be considered "noise" when identifying objects) may reduce computational requirements and increase accuracy during CV processing.

The beam may also be turned off upon determining a match as a component of signaling success to a user. Conversely, leaving the beam turned on during interactions may indicate to the device user that further searching for a page object or location is expected. Using a light beam emanating from a handheld device as a pointing indicator in response to questioning and/or cues are further described in co-pending application Ser. No. 18/201,094, filed May 23, 2023, the entire disclosure of which is expressly incorporated by reference herein.

As described in greater detail below, various methods (e.g., dwell time, voice command) may be used by a device user to indicate (i.e., by the user to the handheld device) that the beam is pointed toward a desired selection. Methods may involve turning the beam off and on multiple times. For example, if dwell time is measured based on not seeing movement within camera-acquired images, then the beam may be turned off while acquiring each image, but kept on otherwise to keep the device user engaged with the pointing process. The beam may be turned off once a predetermined dwell time has been exceeded, or another means of indicating a selection has been detected by the handheld device.

Optionally, beam intensity may also be modulated, for example, based on measurements of one or more reflections within images acquired by the handheld device camera. Reflection intensity may be made clearly discernible to a user over background (e.g., considering ambient lighting conditions, to accommodate for the reflectivity of different surfaces, and/or to accommodate for visual impairment), but not overwhelming (e.g., based on user preference). Beam intensity may be modulated by a number of methods known in the art including regulating the magnitude of the light beam driving current (e.g., with transistor-based circuitry) and/or using pulse width modulation (i.e., PWM).

As a further aspect of systems and methods herein, one or more illumination patterns may be projected within the device beam (and/or shown on device displays). Using the beam to project one or more illumination patterns effectively combines the role of one or more separate displays on the handheld device with beam pointing. Illumination patterns projected within the beam may be formed, for example, using miniature LED arrays, LCD filtering, or DLP (i.e., digital light processing, using an array of microscopic mirrors) methods.

Such illumination patterns may range from simple imagery (e.g., one or more points, line drawings) to complex, rich, high-resolution images. Illumination patterns may be animations, produced to enhance or augment objects, images, or words on which they are projected. They may move in direct proportion to movement of the handheld device from which they are projected, or they may be dynamically stabilized, by using the IMU and/or imagery seen by the camera, to appear stable even when a user is moving the handheld device about.

Within further examples, during interactions enacted by the handheld device, one or more page objects identified within images acquired by the handheld device camera may be "augmented" by light beam projections. For example, if a beam is directed toward a squirrel when looking for a bird within the context of a story (e.g., being listened to), the beam may project a pair of wings superimposed on the printed image of the squirrel as a component of a (silly) interaction query whether the object being pointed at is a bird. As a further example, the apparent color of one or more components of a printed object may be altered as a result of illuminating the overall shape of an object (or individual object components) with selected colors within the beam.

Illumination patterns may be synchronized with other modes of interaction during any activity. For example, each word being read aloud by the device may independently be dynamically illuminated, bounded with a box, underlined, or otherwise annotated. Along similar lines, a static image (e.g., of an animal) might be augmented with a projected image that may then leap around a printed page.

When images and/or symbols (e.g., letters forming words and phrases) are too long and/or complex to be displayed all at once, messages and/or patterns within a beam may be "scrolled." Scrolled text or graphics may be displayed one segment at a time (e.g., providing an appearance of motion) in a predetermined direction (e.g., up, down, horizontally). During and following the process of selecting an object using the light beam (i.e., when attention may be focused on the beam), messages embedded within the beam (e.g., name of an identified object) may be particularly noticed, effective and/or meaningful.

Illumination patterns generated by a beam source may be used to enhance pointing functions including control of the size and/or shape of a beam viewable by a device user. Within an illumination pattern, beam size (e.g., related to the number of illuminated pixels) and relative location (location of illuminated pixels) may be controlled by the handheld device. Different sizes of beams may, for example, be used during different applications such as pointing letters within text (using a narrow beam) versus larger cartoon characters (using a larger beam). The location of a beam may be "nudged" or a pointing direction may be indicated by the handheld device to help direct user attention to a particular (e.g., nearby) object within the camera's field-of-view.

As further aspects of systems and methods herein, viewable information and/or symbols within beam projections with similar optical performance compared with the device camera (e.g., common depth-of-field, minimal distorted when viewed normal to a reflective surface) tends to encourage and/or mentally nudge handheld device users to orient and/or position the handheld device such that the information and/or symbols are most viewable (e.g., in focus, not skewed) by both the device user and the device camera. As a consequence, well-positioned and oriented camera-acquired images (i.e., at a working distance and viewing angle readily viewable by the user and camera) may facilitate computer vision processing (e.g., improving classification reliability and accuracy).

As an example, a symbol or pattern comprising a "smiley face" may be readily recognized (perhaps even inherently) by a young child. A child may, with minimal instruction, innately position the device at a distance and/or angle, to obtain a clear, non-distorted image of the smiley face (given a child's innate recognition of this universally recognized image). Further, the lens and filter construction of the smiley face light beam may be designed to present the image in focus, only within a desired "sweet spot" distance from a reflective surface. A user may be unaware that an ability to readily view and/or identify projected beam patterns also enhances image quality for camera-based image processing.

Further, if the projected image has a directionality or typical viewing orientation (e.g., text, image of a person standing up), then most users may tend to manipulate the handheld device such that the projected image is oriented in a viewing orientation typical for the object. Alternatively, by measuring the orientation of the handheld device (e.g., using an IMU), a particular orientation of the projected pattern or image may be maintained (e.g., using the gravitational pull of the earth as a reference). An image may be projected in a manner that maintains a preferred orientation, for example, relative to other objects in the environment of the handheld device user.

As further aspects of systems and methods herein, the handheld device user may indicate (i.e., to the handheld device) that the beam is pointed toward a selected object and a selection is being made. Such indications may be made via a range of interactive methods, such as:
1. pressing or releasing a switch (e.g., pushbutton, or other contact or proximity sensor) that is a component of the handheld device,
2. providing a verbal indication (e.g., saying "now") sensed by a handheld device microphone and identified (e.g., classified using natural language processing) by the device processor or a remote processor,
3. point the beam at an object (i.e., absent substantial movement) for a predetermined (e.g., based on user preferences) "dwell" time,
4. orienting the device in a predetermined direction (e.g., vertically relative to the gravitational pull of the earth, tipping the device forward) sensed by a handheld device IMU, or
5. gesturing or tapping the handheld device, also sensed by a handheld device IMU.

Within these latter exemplary cases, in which signaling movements of the handheld device by the user (e.g., gesture, tap) may produce motion within the camera's field-of-view, a stationary image may be isolated (e.g., from a continuously sampled series of images) prior to any process that might produce movement. The camera-acquired image prior to any motion-based signaling may be used to identify a viewable object or location being pointed at.

Within further examples, one method to implement dwell-based methods involves ensuring a number of consecutive images (e.g., computed from desired dwell time divided by frame rate) to reveal a substantially stationary viewable object and/or beam reflection. CV techniques such as template matching, computer vision, or neural network classification may be used to compute one or more spatial offsets comparing pairs of successively acquired camera images. Image movement (e.g., to compare with a dwell movement threshold) may be computed from the one or more spatial offsets or a sum of offsets over a selected time.

When determining rapid and/or precise dwell times, movement measurements based on camera images demand high frame rates, and resultant computational and/or power needs. Alternative methods to determine if a sufficient dwell time has elapsed include using an IMU to assess whether the handheld device remains substantially stationary for a predetermined period.

Conversion of analog IMU data into a digital form, suitable for processing, may use analog-to-digital (A/D) conversion techniques, well-known in the art. IMU sample rates may generally be in a range from about ten (10) samples/second (even lower sample rates may be employed, if desired) to about the thousand (10,000) samples/second where higher IMU sample rates involve trade-offs involving signal noise, cost, power consumption and/or circuit complexity. Movement and/or dwell time thresholds may be based on preferences by the device user.

Gesture-based selection indications may include translational motion, rotation, lack of movement, tapping the device, and/or device orientation. User intent(s) may, for example, be signaled by:
1. motion of any sort (e.g., above IMU noise levels),
2. movement in a particular direction,
3. velocity (e.g., in any direction) above a threshold value,
4. a gesture using the handheld device (e.g., known movement pattern),
5. pointing the handheld device in a predetermined direction,
6. tapping the handheld device with a digit of an opposing hand,
7. tapping the handheld device with a striking object (e.g., stylus),
8. striking the handheld device against a solid object (e.g., desk), and/or
9. striking the handheld device against an additional handheld device.

In yet further examples to determine user intent based on IMU data streams, a "tap" of the handheld device may be identified as a result of intentionally moving and subsequently causing an object (i.e., a "striking object") to hit a location on the surface of a handheld device (i.e., "tap location") targeted by the user. A computed tap location on a handheld device may be used to convey additional information about intent (i.e., in addition to making an object selection) by the device user. As examples, user confidence in making a selection, indicating a first or last selection that is a part of a group of objects, or a desired to "skip forward" during a sequential interactive sequence may each be signaled based on directional movement(s) and/or tap location(s) on the handheld device.

Characteristics of a tap may be determined when a stationary handheld device is struck by a moving object (e.g., a digit of the hand opposing the hand holding the device), when the handheld device itself is moved to strike another object (e.g., table, another handheld device), or when both the striking object and the handheld device are moved simultaneously prior to contact. IMU data streams prior to and following a tap may help to determine whether a striking object was used to tap a stationary device, the device was forcefully moved toward another object, or both processes occurred simultaneously.

Tap locations may be determined using distinctive "signatures" or waveform patterns (e.g., peak force, acceleration directions) within IMU data streams (i.e., particularly accelerometer and gyroscopic data) that vary, depending on tap location. Determining tap location on the surface of a handheld device based on inertial (i.e., IMU) measurements and subsequent control of activities are more fully described in U.S. Pat. No. 11,614,781, filed Jul. 26, 2022, the entire disclosure of which is expressly incorporated herein by reference.

As further aspects of devices and methods herein, various actions may be performed by the handheld device processor based on indicating a selection. Upon determining a camera image does not match any page layout, the handheld device may simply acquire subsequent camera images to continue monitoring whether a match has been found. Alternatively, or in addition, prompts and/or cues may be provided including repeating a previous interaction, keeping the beam turned on, and/or presenting a new interaction (e.g., acquired from the template database) to hasten and/or enhance a selection process.

Upon determining a page layout location and/or selected object, an action enacted by a processor within the handheld device may be enacted within the device itself. As more fully described above, this may include audible, haptic and/or visual actions for example, indicating a successful page layout matching and/or enhancing the storyline within the page.

An action enacted by a handheld device processor may include transmitting available information related to the selection process to a remote device where, for example, further action(s) may be enacted. Transmitted information may include the camera image(s), an acquisition time of the acquiring camera image(s), the predetermined camera image light beam pointing region, the template of the selected page, any contextual information, and the one or more selected objects or locations may be included in the transmitted dataset.

Particularly when used in entertainment, educational and/or collaborative settings, an ability to transmit the results of finding objects allows the handheld device to become a component of larger systems. For example, when used by a child or learner, experiences (e.g., successfully selecting objects, or not) may be shared, registered, evaluated, and/or simply enjoyed with connected parents, relatives, friends and/or guardians. Real-time and essentially continuous assessment of metrics such as literacy, reading comprehension, overall interest in reading, and skills development may help identify children (at an early stage, when interventions are most beneficial) who might benefit from additional support or resources. As examples, early intervention support may include adaptations for dyslexia, dyscalculia, autism, or identifying users who might benefit from gifted and talented programs.

Optionally, the handheld device may additionally include one or more photodiodes, an optical blood sensor, and/or an electrical heart sensor, each operatively coupled to the device processor. These handheld device components may provide additional elements (i.e., inputs) to help monitor and determine user interactions. For example, a data stream from a heart rate monitor may indicate stress or duress during selection processes. Based on detected levels, previous interactions, and/or predefined user preferences, interactions involving object selections may be limited, delayed or abandoned.

Within additional examples, although not "handheld" in a strict sense, such portable electronic devices may be affixed and/or manipulated by other parts of the human body. A device that interacts with a user to point a light beam toward objects may, for example, be affixed to an arm, leg, foot or head. Such positioning may be used to address accessibility issues for individuals with restricted upper limb and/or hand movement, individuals lacking sufficient manual dexterity to convey intent, individuals absent a hand, and/or during situations where a hand may be required for other activities.

Interactions using the handheld device may additionally take into account factors associated with accessibility. For example, particular colors and/or color patterns may be avoided within visual interactions when devices are used by individuals with different forms of color blindness. The size and/or intensity of symbols or images broadcast on one or more handheld device displays and/or within the beam may accommodate visually impaired individuals. Media containing selectable objects may be Braille-enhanced (e.g., containing both Braille and images), and/or contain patterns and/or textures with raised edges. Beam intensity may be enhanced and/or the handheld device camera may track pointing by a finger (e.g., within regions containing Braille) to supplement pointing using a light beam.

Along similar lines, if an individual has a hearing loss over one or more ranges of audio frequencies, then those frequencies may be avoided or boosted in intensity (e.g., depending on the type of hearing loss) within audio interactions generated by the handheld device. Haptic interactions may also be modulated to account for elevated or suppressed tactile sensitivity of an individual.

During activities that, for example, involve young children or individuals who are cognitively challenged, interactions may involve significant "guessing" and/or needs to guide a device user. Assisting a user during an interaction and/or relaxing the precision of pointing may be considered a form of "interpretive control". Interpretive control may include "nudging" (e.g., providing intermediary hints) toward one or more target responses or reactions. For example, a young child may not fully understand how to manipulate the handheld device. During such interactions, auditory instruction may accompany the interactive process (e.g., broadcasting "hold the wand straight up"), guiding the individual toward a selection.

Similarly, a flashing display and/or repeating sound (where frequency may be related to how close a cue or attribute is to a particular selection) may be broadcast as a user approaches a selectable object and/or anticipated response. On the other hand, a reaction in which there is no apparent attempt to point the beam may be accompanied by a "questioning" indication (e.g., haptic feedback and/or buzzing sound), as a prompt promoting alternative considerations. Further aspects of interpretive control are more fully described in U.S. Pat. No. 11,334,178, filed Aug. 6, 2021, and U.S. Pat. No. 11,409,359 filed Nov. 19, 2021, the entire disclosures of which are expressly incorporated herein by reference.

FIG. 1 shows an exemplary scenario in which a child 11 uses a right hand 14 to manipulate a light beam 10a generated by a handheld device 15 to point toward (and select) a drawing of a dog 12b. The dog 12b is one of several characters in a cartoon scene 12a within two pages 13a, 13b of a children's book. The child 11 is able to see a reflection 10b generated by the light beam 10a at the location of the dog 12b within the rightmost page 13b of the printed book.

The child may identify and select the dog 12b during an interactive sequence using the handheld device 15, resulting in audible feedback (e.g., a barking sound) played on a device speaker 16, and/or visual indications (e.g., spelling the word "DOG") presented on one or more device displays 17a, 17b, 17c and/or within the projected light beam 10a.

Optionally, depressing a pushbutton 18 (or other signaling mechanism, such as a voice prompt such as saying "OK", detected by a device microphone; or movement gesture or handheld device orientation relative to the gravitational pull of the earth, sensed by an IMU) may be used to turn the light beam 10a on. Release of the pushbutton 18 (or other signaling mechanism) may be used to indicate that a selection (i.e., of the dog 12b) has been made and, optionally, that the light beam 10a may be turned off (e.g., until another selection is to be made).

A handheld device camera (not visible within the viewing perspective of FIG. 1) pointed toward the page in the same direction as the beam 10a may acquire one or more images of the region being pointed at by the light beam. Co-location of the light beam pointing region and the camera's field-of-view allows objects and/or locations selected using the light beam to be determined within templates of interactive book pages.

Figure 2:
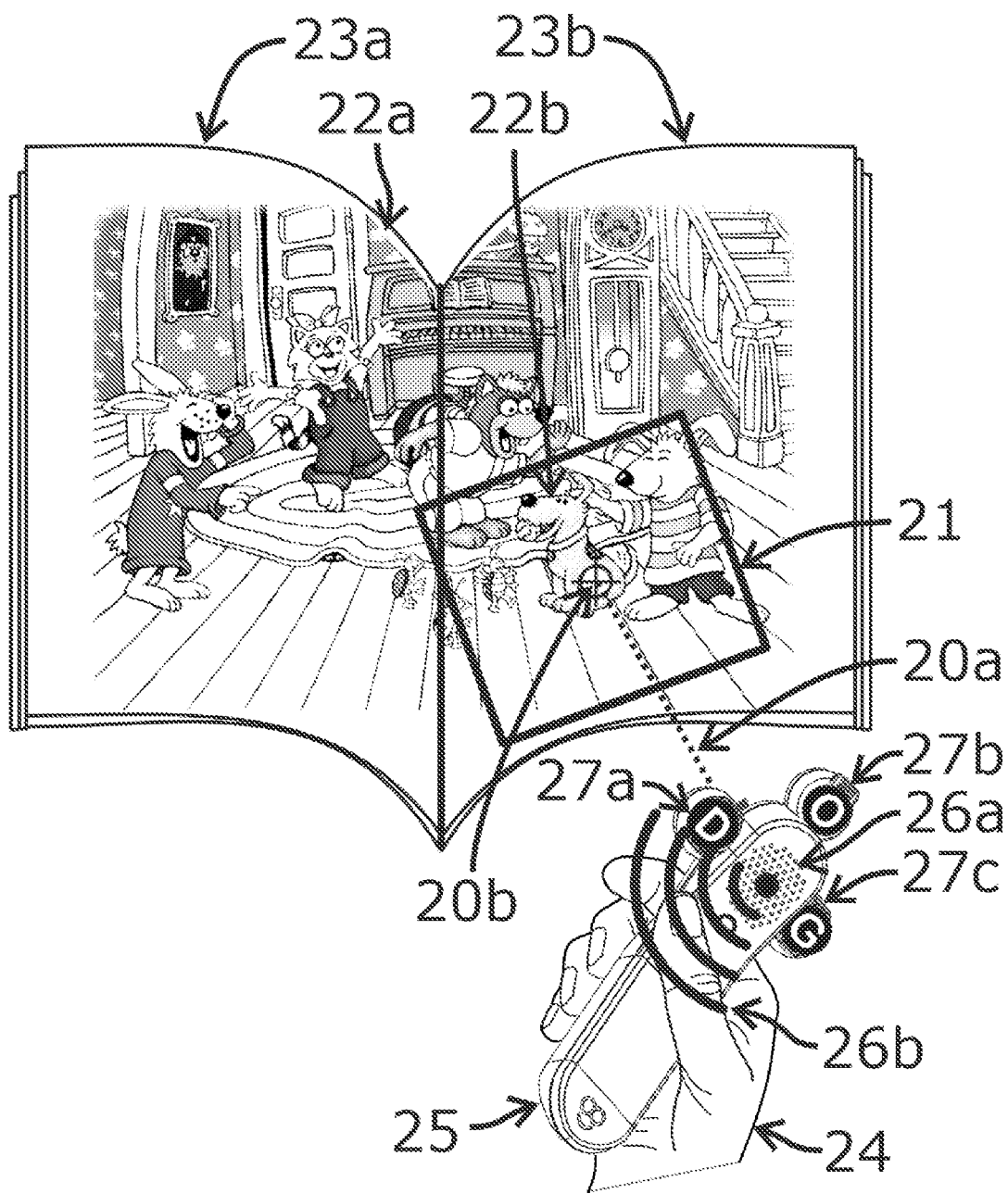
FIG. 2 shows, within the exemplary scenario presented in FIG. 1, superposition of a camera-acquired image that has been matched using computer vision with a page layout, where the light beam pointing location (indicated by a cross-hair target) may be known within the camera's field-of-view.

FIG. 2 follows on with the exemplary scenario illustrated in FIG. 1, showing a field-of-view of the handheld device camera at 21 within the two book pages 23a, 23b. As in FIG. 1, the handheld device 25 is manipulated by a child's right hand 24 to point toward selected objects (e.g., the dog 22b) or locations within the cartoon scene 22a.

During acquisition of camera images, the light beam may be left on (e.g., typically generating a visible reflection off the page 23b) or, optionally, the beam may be momentarily (i.e., during camera acquisition) turned off as indicated in FIG. 2 by a dashed line traversing the beam path 20a (if it were turned on). Because light paths of the beam and camera originate within the handheld device 25 and are pointed in the same direction, the location being pointed to by the beam (indicated by a cross-hair pattern 20b) may be known within camera images, even when the beam is turned off. Turning the beam off during camera-based acquisitions may help CV processes to match camera images with locations within page layouts by avoiding image distortions produced by light beam reflections.

When a predetermined interactive page layout or template, or portion of a template, is found that matches the field-of-view 21 of the handheld device camera image, the image may be superimposed on the page 23b (as illustrated by FIG. 2). This allows the beam location (i.e., known within camera images) to be determined within the page layout (and/or its associated databases).

Knowing the location being pointed at by the device user triggers access to predetermined datasets associated with locations (or regions) within an interactive page layout. In the canine case illustrated in FIG. 2, information about the particular dog being pointed at, dogs in general and/or the role of the dog within the context of the story may be broadcast.

For example, the three spherical displays 27a, 27b, 27c on a handheld device may spell the word "DOG" (i.e., upon pointing at the dog 22b). Alternatively, or in addition, the device speaker 26a may announce at 26b the word "dog", produce barking sounds, and/or provide a proper name for the dog along with general information about dogs. As a further example of handheld device rewards and/or feedback, haptic stimulation generated by the handheld device may accompany barking sounds and/or acknowledge (using vibration) that an anticipated selection (e.g., in response to a query by the handheld device) has been made.

Additionally, the occurrence of a user selection, location of the selection within a template, associated layout datasets, timing and identity of any selected object(s) 22b (or, lack of any selection) may subsequently control further actions enacted directly by the handheld device 25 and/or conveyed to one or more remote devices (not shown) to trigger further activities.

Figure 3:
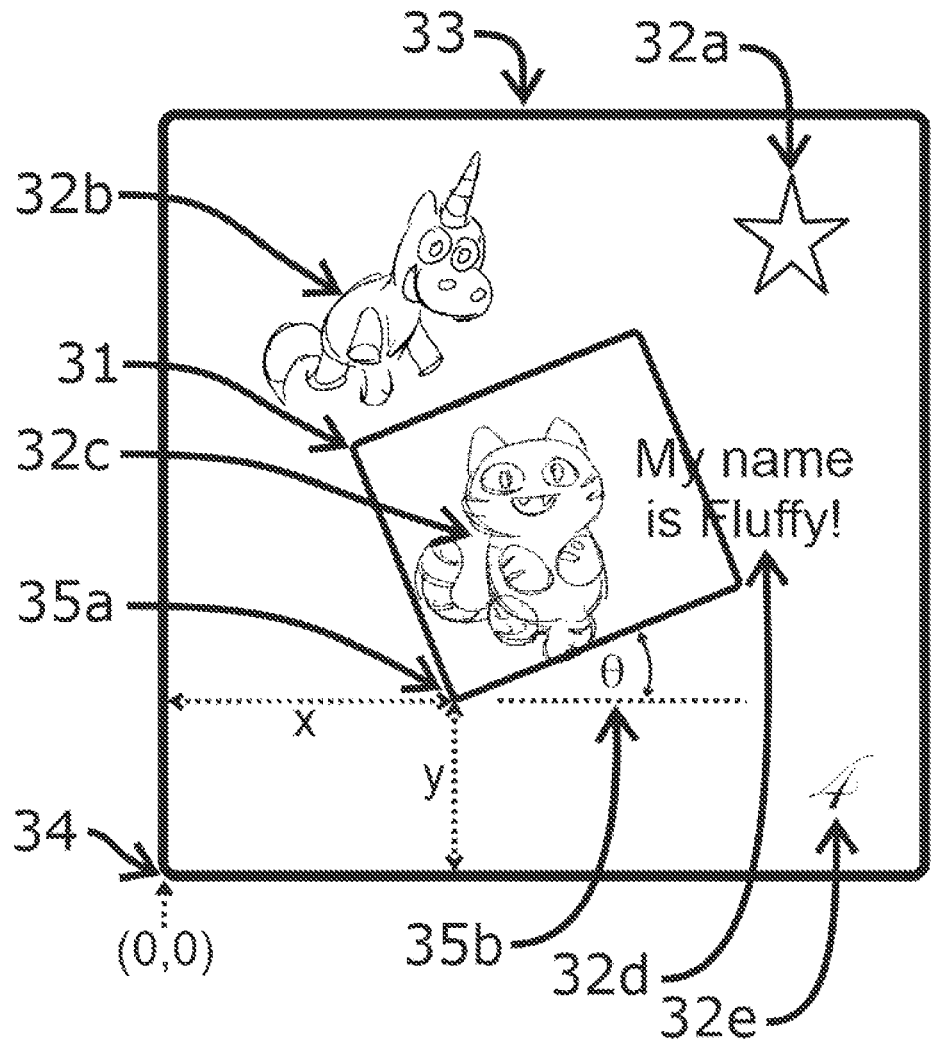
FIG. 3 illustrates exemplary parameters that may define the position of a camera's field-of-view within a page layout including a horizontal and vertical reference (e.g., corner) position (x,y), orientation (θ), and a magnification (m) of a camera-acquired image.

FIG. 3 illustrates exemplary parameters that may be computed during CV-based methods to match a camera-acquired image with a predetermined page layout or template 33. In this example, the page contains the symbol of a star 32a, a cartoon drawing of a unicorn 32b, a drawing of a cat 32c, some text about the cat's name 32d, and a page number 32e. In addition to a page layout 33, page attributes may point toward one or more datasets containing additional information (e.g., text, audio clips, queries, sound effects, follow-on prompts) that may be used during subsequent interactions involving the handheld device user.

Methods to position a camera-acquired image within a dataset of layouts and/or templates may use CV techniques such as convolution neural networks, machine learning, deep learning networks, transformer models, and/or template matching. Location parameters may include a reference position of the camera field-of-view 31 within the template 33. Horizontal and vertical coordinates (e.g., using a Cartesian coordinate system) may be specified by, for example, determining the position of the lower-left corner of the camera field-of-view, typically denoted (x,y), at 35a relative to a coordinate system of the page layout with an origin, typically denoted (0,0), at its lower-left corner.

Since a device user may tip (i.e., orient) the handheld device when pointing the light beam (e.g., relative to the orientation of a page), the camera field-of-view may not be aligned with a coordinate system of a page layout. To account for this, an orientation angle, typically denoted $\theta$, may be computed based on image orientation.

Along similar lines, the user may move the handheld device about, at different distances from a page surface. Under these conditions, using a device camera with fixed optics (i.e., no ability to optically zoom), variations in the area of a page covered by the camera's field-of-view are produced (i.e., larger areas are covered when the handheld device is held further away from a page). Thus, a magnification factor, typically denoted m, may be computed based on the size of the page covered. Taken together, (x,y), $\theta$ and m may be used to compute (i.e., superimpose) any location within a camera-acquired image (e.g., including a location of a light beam) onto a page layout.

Figure 4:
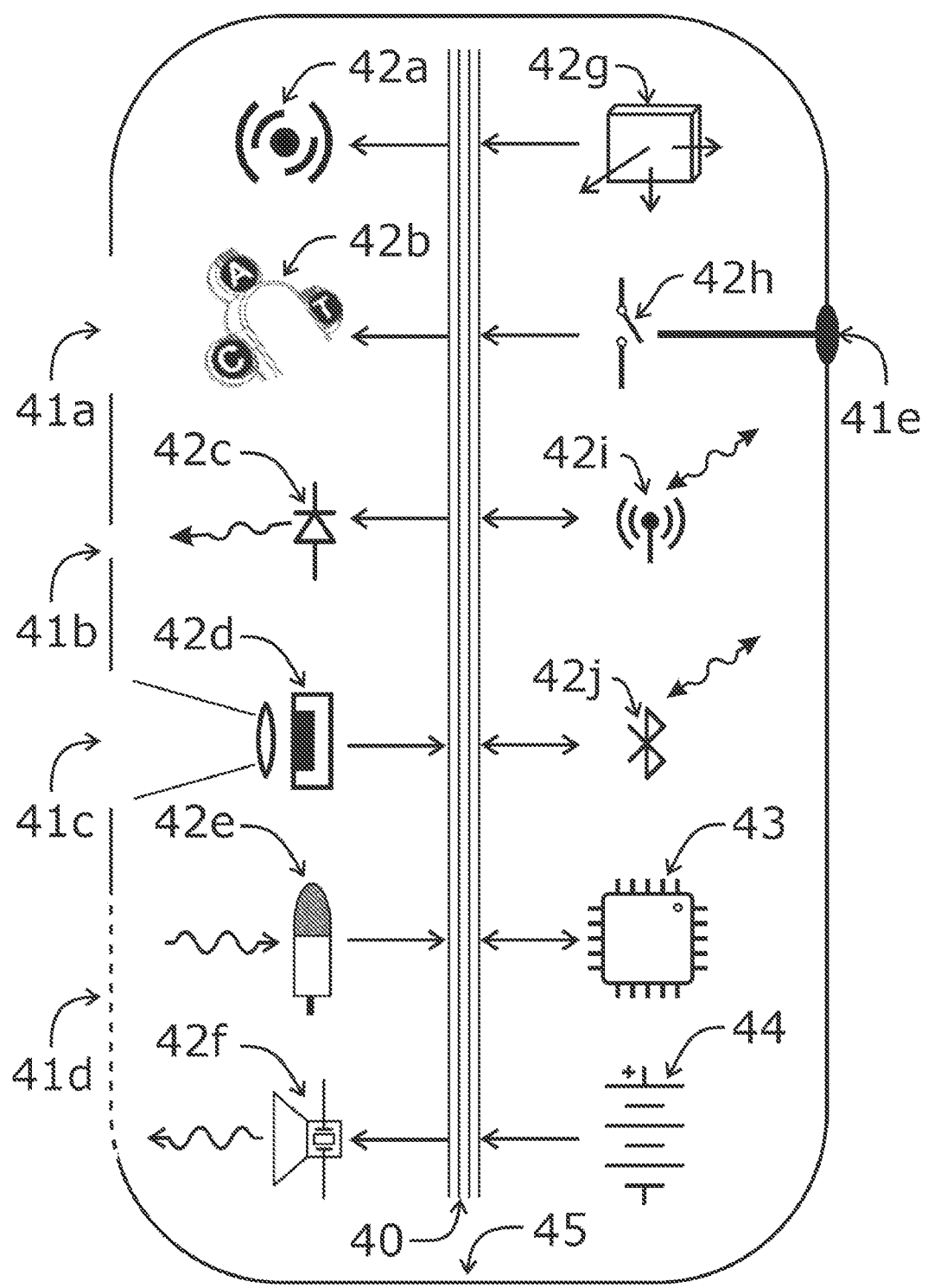
FIG. 4 is an exemplary interconnection layout of components within a handheld device (in which some components may not be used during some applications) showing predominant directions for the flow of information relative to a bus structure that forms an electronic circuitry backbone.

FIG. 4 is an exemplary electronic interconnection diagram of a handheld device 45 illustrating components at 42a, 42b, 42c, 42d, 42e, 42f, 42g, 42h, 42i, 42j. 43, 44 and predominant directions for the flow of information during use (i.e., indicated by the directions of arrows relative to an electronic bus structure 40 that forms a backbone for device circuitry). All electronic components may communicate via this electronic bus 40 and/or by direct pathways (not shown) with one or more processors 43. Some components may not be required or used during specific applications.

A core of the portable, handheld device may be one or more processors (including microcomputers, microcontrollers, application-specific integrated circuits (ASICs), field-programmable gate arrays (FPGAs), etc.) 43 powered by one or more (typically rechargeable or replaceable) batteries 44. As shown in FIG. 6, handheld device elements also include a light beam generating component 42c (e.g., typically a light-emitting diode), and camera 42d to detect objects in the region of the beam (that may include a reflection produced by the beam). If embedded within the core of the handheld device 45, both the beam source 42c and camera 42d may require one or more optical apertures and/or optical transparency (41b and 41c, respectively) through any handheld device casing 45 or other structure(s).

During applications that include acoustic cues or feedback, a speaker 42f (e.g., electromagnetic coil or piezo-based) 42f may be utilized. Similarly, during applications that might include audio-based user interactions, a microphone 42e may acquire sounds from the environment of the handheld device. If embedded within the handheld device 45, operation of both the speaker 42f and the microphone 42e may be aided by acoustic transparency through the handheld device casing 45 or other structure(s) by, for example, coupling tightly to the device housing and/or including multiple perforations 41d (e.g., as further illustrated at 26a in FIG. 2).

During applications that, for example, include vibrational feedback and/or to alert a user that a selection might be expected, a haptic unit 42a (e.g., eccentric rotating mass or piezoelectric actuator) may be employed. One or more haptic units may be mechanically coupled to locations on the device housing (e.g., to be felt at specific locations on the device) or may be affixed to internal support structures (e.g., designed to be felt more generally throughout the device surface).

Similarly, during applications that include visual feedback or responses following object selection, one or more displays 42b may be utilized to display, for example, letters (as illustrated), words, images and/or drawings related to selected objects (or to indicate that an object has been incorrectly pointed at). Such one or more displays may be affixed and/or exterior to the main handheld device body (as shown at 42b), and/or optical transparency may be employed within a device casing as indicated at 41a.

During typical interactions, a user may signal to the handheld device at various times such as when ready to select another object, pointing at a new object, agreement about a previously selected object, and so on. User signaling may be indicated by verbal feedback sensed by a microphone, as well as movement gestures or physical orientation of the handheld device sensed by an IMU 42g. Although illustrated as a single device at 42g, different implementations may involve distributed subcomponents that, for example, separately sense acceleration, gyroscopic motion, magnetic orientation, and gravitational pull. Additionally, subcomponents may be located in different regions of a device structure (e.g., distal arms, electrically quiet areas) to, for example, enhance signal-to-noise during sensed motions.

User signaling may also be indicated using one or more switch devices including one or more pushbuttons, toggles, contact switches, capacitive switches, proximity switches, and so on. Such switch-based sensors may require structural components at or near the surface of the handheld device 41e to convey forces and/or movements to more internally located circuitry.

Telecommunications to and from the handheld device 45 may be implemented using Wi-Fi 42i and/or Bluetooth 42j hardware and protocols (e.g., each using different regions of the electromagnetic spectrum). During exemplary scenarios that employ both protocols, shorter-range Bluetooth 42j may be used, for example, to register a handheld device (e.g., to identify a Wi-Fi network and enter a password) using a mobile phone or tablet. Subsequently, Wi-Fi protocols may be employed to allow the activated handheld device to communicate directly with other, more distant devices and/or the World Wide Web.

Figure 5:
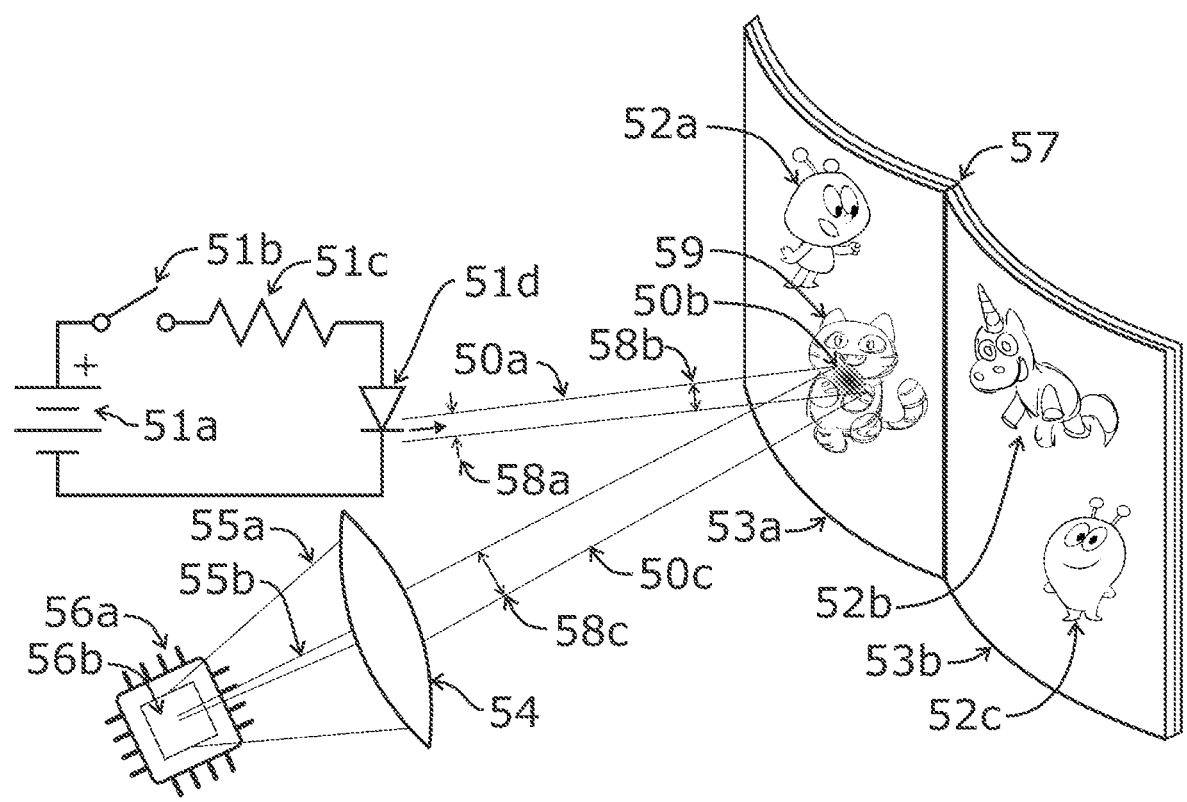
FIG. 5 is an electronic schematic and ray diagram showing exemplary elements of the generation, light path and detection by a camera of a feline object selected on a book page using a light beam emanating from a handheld device.

FIG. 5 shows components of an electronic schematic and ray diagram illustrating exemplary elements for beam generation 51a, 51b, 51c, 51d, beam illumination 50a and reflected 50c light paths, and detection by a camera 56a of a drawing of a cat 59 being pointed at within pages 53a, 53b of a book 57. The drawing of the cat 59 may be selected within page sketches that include a cartoon character 52a on the leftmost page 53a, a second cartoon character 52c on the rightmost page 53b page, and a unicorn 52b. Both the electronic circuitry 51a, 51b, 51c, 51d as well as the camera 56a and its associated optics 54 may be incorporated within the body of a handheld device (not shown).

Components of the beam generating circuitry may include: 1) a power source 51a that typically comprises a rechargeable or replaceable battery within the portable, handheld device, 2) optionally, a switch 51b or other electronic control device (e.g., pushbutton, relay, transistor) that may be governed by the handheld device processor and/or the device user to turn the pointing beam on and off, 3) a resistor 51c (and/or transistor that may regulate beam intensity) limiting current delivered to the beam source, since LEDs are generally configured in a forward bias (i.e., lower resistance) direction, and 4) a beam source, typically comprising a lasing or light emitting diode 51d.

Precision optics (that may comprise multiple optical elements including some encapsulated within the diode-based light source, not shown) may largely collimate the beam 50a, optionally also providing a small (i.e., designed) degree of beam divergence. As a consequence, beam dimensions emanating from the light source 58a may be smaller than at some distance along the light path 58b. The illuminating beam 50a divergence, along with the distance between the light source 51d and the selected object 59, largely govern a reflected beam spot size 50b.

Further, the beam reflected off the selected object 50c may continue to diverge where, for example, in FIG. 5, the size of the reflected beam 58c is larger than the illuminating beam 58b. The size and shape of the illumination spot 50b (and its reflection) may also be affected by the location of the beam relative to the reflective surface (e.g., angle relative to a normal to the reflective surface) and/or the shape of the reflective surface(s). For example, the horizontal dimension of the leftmost page 53a is curved convexly relative to the incident beam 50a, causing (e.g., a Gaussian profile and/or circular shaped) illumination beam to generate a reflected spot 50b that may be elliptical in nature (i.e., wider in the horizontal dimension).

Light from the field-of-view of the camera 56*a* may be collected by camera optics 54 that focus images as represented by ray 55*a*, including a focused reflected beam spot 55*b*, onto the light-sensing components of the camera 56*b*. Such sensed images may then be digitized using techniques know in the art, and subsequently processed (e.g., using CV techniques) to identify the location being pointed at within the camera's field-of-view.

FIG. 6 is an exploded-view drawing of a handheld device 65 showing exemplary locations for a light beam source 61*a* and a camera 66*a*. Such components may be internalized within the handheld device 65 during final assembly. This view of the handheld device 65 also shows the backsides of three spherical displays 67*a*, 67*b*, 67*c* attached to the main body of the handheld device 65.

The light beam source may comprise a lasing or non-lasing light-emitting diode 61*a* that may also include embedded and/or external optical components (not viewable in FIG. 6) to form, structure and/or collimate the light beam 60. Beam generation electronics and optics may be housed in a sub-assembly 61*b* that provides electrical contacts for the beam source and precision control over beam aiming.

Along similar lines, the process of image acquisition is achieved by light gathering optics 64*a* incorporated within a threaded housing 64*b* that allows further (optional) optics to be included in the light path for magnification and/or optical filtering (e.g., to reject reflected light emanating from the beam). Optical components are attached to a camera assembly 66*a* (i.e., including the image-sensing surface) that, in turn, is housed in a sub-assembly that provides electrical contacts for the camera and precision control over image detection direction.

An aspect of the exemplary configuration shown in FIG. 6 includes the light beam 60 and image-acquiring optics of the camera 64*a* pointing in the same direction 62. As a result, beam reflections off any viewable object occur within about the same region within camera-acquired images, regardless of the overall pointing direction and/or orientation of the handheld device. Depending on relative alignment and separation (i.e., of the beam source and camera 63), the location of the beam reflection may be centered (at a typical working distance) or offset somewhat from the center of camera-acquired images. Additionally, small differences in beam location may occur at different distances from the handheld device to a reflective surface due to the (designed to be small) separation at 63 between the beam source 61*a* and camera 66*a*.

Such differences may be estimated using mathematical techniques analogous to those describing parallax. As a result, even if the pointing beam is turned off (i.e., absent a beam reflection within camera images) beam locations may be determined based on where beam optics are pointed within the camera's field-of-view. Conversely, any measured shift in the location of the center (or any other reference) of a light beam reflection within a camera image may be used to estimate a distance from the handheld device (more specifically, the device camera) to the viewable object based on geometry.

Figure 7:
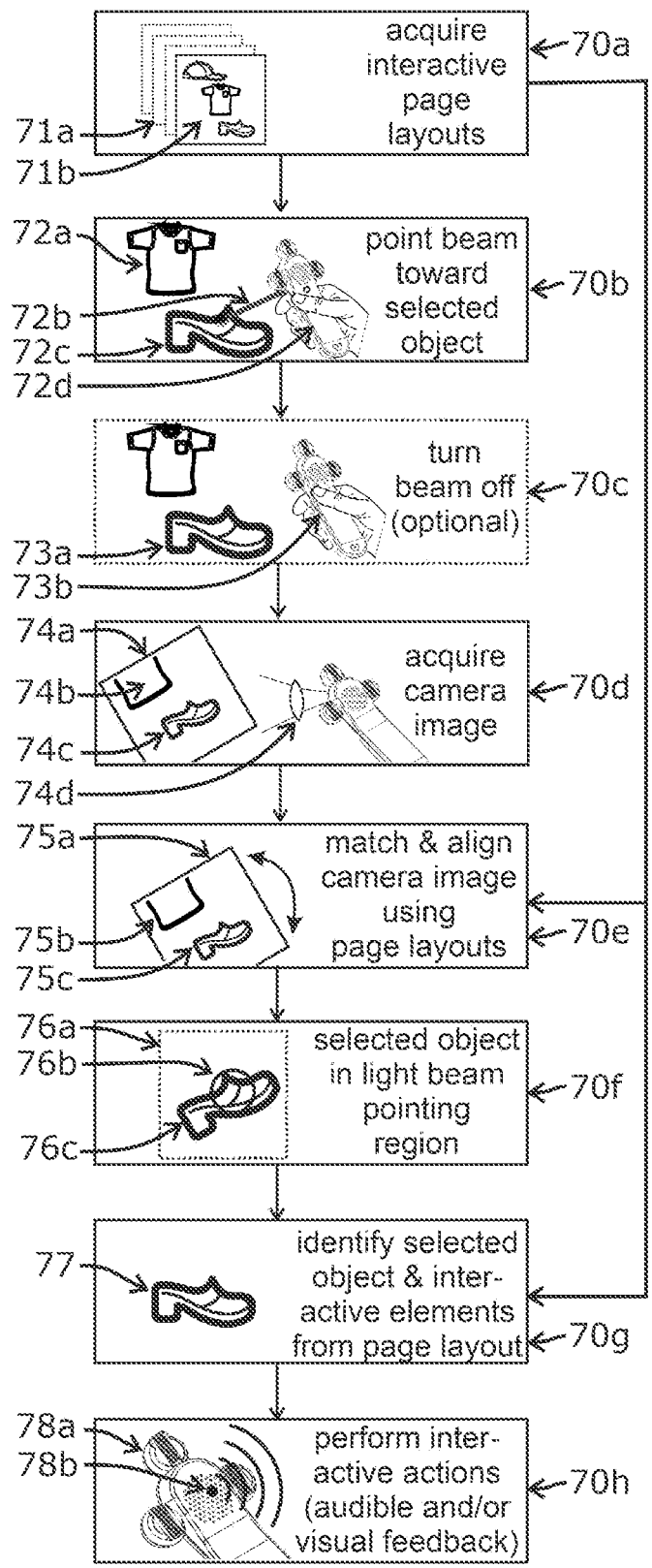
FIG. 7 is a flow diagram illustrating exemplary steps in which an image of a shoe being pointed at using a light beam generated by a handheld device is located within an interactive page layout that, in turn, provides audible feedback to the device user.

FIG. 7 is an exemplary flow diagram illustrating steps in which an image of a shoe 72*c* being pointed at using a light beam 72*b* generated by a handheld device 72*d* is selected within an interactive page 74*a*. The shoe 72*c* is one choice within a collection of fashion accessories that includes a t-shirt 72*a*. Once located within the page layout, predetermined audible feedback associated with the shoe selection (e.g., type, features) within the interactive page may be played on the device speaker 78*b*. Steps in this selection process include:

1) at 70*a*, the processor of the handheld device acquires predetermined interactive page layouts 71*a* that include a page 71*b* containing clothing accessories including a baseball cap, t-shirt, and shoe;
2) at 70*b*, the user points a light beam 72*b* generated by a handheld device 72*d* toward the shoe 72*c*, located in proximity to an image of a t-shirt 72*a*;
3) optionally (indicated by the dashed line outline), at 70*c*, the light beam emanating from the handheld device 73*b* (pointed at the image of a shoe 73*a*) may be turned off, to avoid light beam reflections, prior to acquiring a camera-based image;
4) at 70*d*, using a camera (not visible) and focusing optics 74*d* (depicted apart from the body of the handheld device for illustration purposes only), acquire an image in which the camera's field-of-view 74*a* includes the lower half of a t-shirt 74*b* and a shoe 75*c*;
5) at 70*e*, compare page layouts and/or templates previously acquired at step 70*a* with the camera-based image 75*a* (containing the lower half of a t-shirt 75*b* and a shoe 75*c*) to determine a best match and alignment within a page layout;
6) at 70*f*, isolate a region of the camera image 76*a* that includes the location or region of light beam reflection 76*b* (whether the beam is turned on or not) indicating a shoe section 76*c* by the device user;
7) at 70*g*, based on the selected location or region within the page layouts previously acquired at step 70*a*, identify the selected object (i.e., as a shoe) along with related interactive elements from the page layout database; and
8) at 70*h*, perform audible (using the handheld device speaker 78*b*) and/or visual (using the one or more device displays 78*a*) interactive actions within the page layout database based on the shoe selection.

Figure 8:
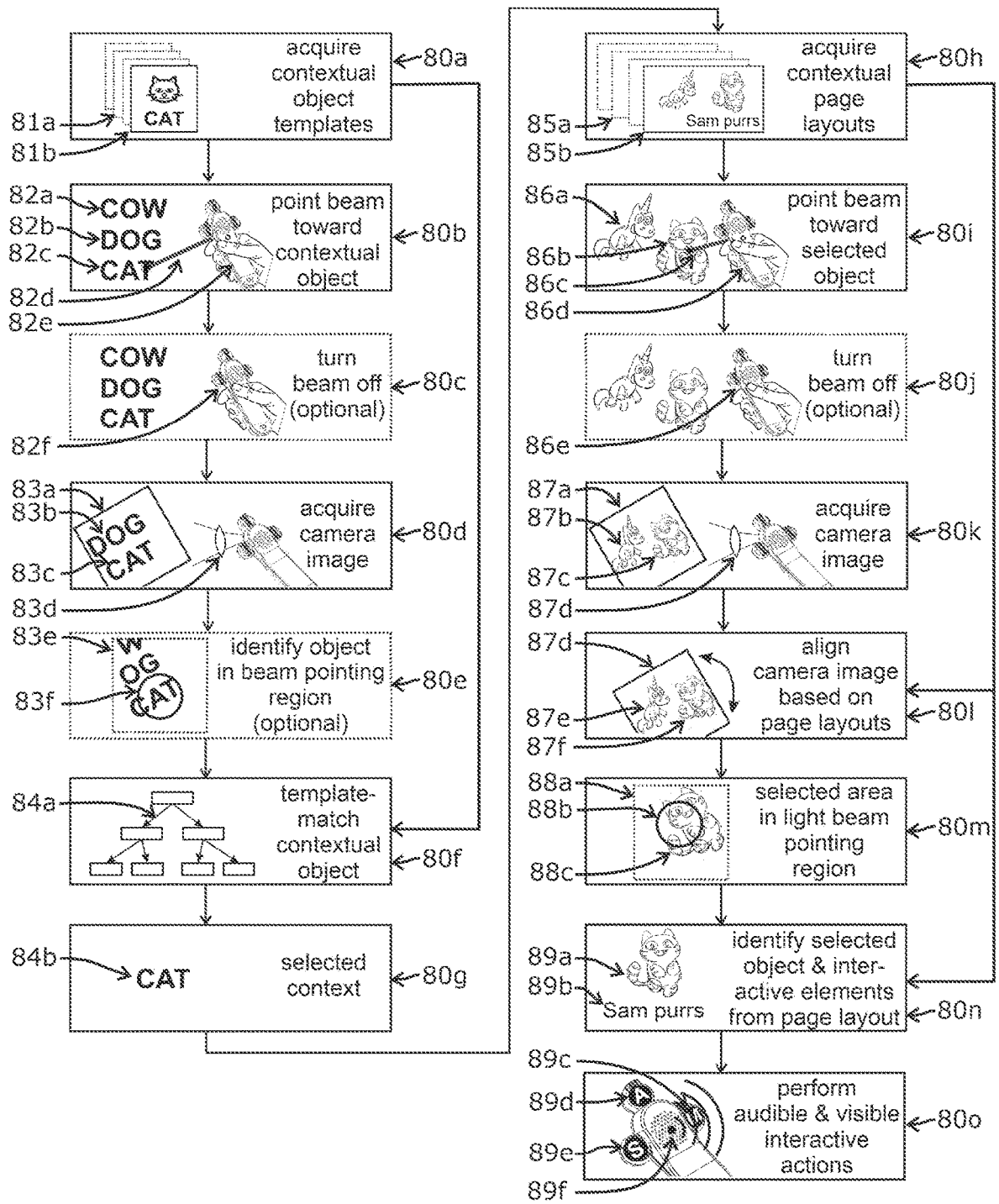
FIG. 8 is a flow diagram illustrating an exemplary two-stage process in which a context (in this case, the word "CAT" within a list of animals) is first selected using a light beam and subsequent handheld device interactions are confined to identifying beam locations within pages related to the selected context.

FIG. 8 is a flow diagram, building upon FIG. 7, illustrating a two-stage process for a user to interact with images and content related to cats by first specifying (i.e., selecting) a feline context and then interacting with one or more interactive pages containing content about cats. The first stage comprises selecting, from a cluster of textual options (a list of animals 82*a*, 82*b*, 82*c*), the word "CAT" 82*c* using a light beam 82*e* emanating from a handheld device 82*e*. In this case, identifying context includes a step at 80*e* that uses beam location to isolate a particular contextual object within the camera-acquired image (an optional step that may not be required in other cases such as identifying a book cover).

Once a feline context has been established by the device user, page layouts associated with cats (e.g., books, posters or articles about cats, at 85*a*) are identified and/or acquired by the device processor. During this second stage, the user may interact, again including using the light beam at 86*c*, with page contents, including both audible and visual information and/or feedback. Steps in this two-stage process include:

1) at 80*a*, the processor of the handheld device acquires page layouts and/or object templates 81*a* that include lists of animals including images and text related to cats 81*b*;
2) at 80*b*, using a light beam 82*d* generated by a handheld device 82*e*, the user points at the word "CAT" 82*c* from a list of animals that includes a "COW" 82*a* and "DOG" 82*b*;

3) optionally (indicated by the dashed line outline), at 80*c*, the light beam emanating from the handheld device 82*f* (pointed at the word "CAT" 82*c*) may be turned off to avoid interference by light beam reflections within images when identifying textual content;

4) at 80*d*, using a camera (not visible) and focusing optics 83*d* (depicted apart from the body of the handheld device for illustration purposes only), acquire an image in which the camera's field-of-view 83*a* includes the word "DOG" 83*b* and "CAT" 83*c*;

5) at 80*e*, (where step 80*e* may not be performed in all cases, as indicated by a dashed line outline), isolate a region of the camera image 83*e* that includes the location or region of light beam reflection 83*f* (whether the beam is turned on or not) indicating a section by the device user;

6) at 80*f*, in this exemplary case, use template matching methods at 84*a* (using templates acquired at step 80*a*) to identify the selection being pointed at using the light beam;

7) at 80*g*, template matching results in the word "CAT" 84*b* being identified as a context for future interactions;

8) at 80*h*, the processor of the handheld device acquires multiple page layouts related to cats 85*a* including a page that contains images and text about a cat named Sam 85*b*;

9) at 80*i*, again using a light beam 86*c* generated by the handheld device 86*d*, the user points toward a drawing of a selected cat 86*b* in the vicinity (e.g., on the same page) of a drawing of a unicorn 86*a*;

10) optionally (indicated by the dashed line outline), at 80*j*, the light beam emanating from the handheld device 86*e* (pointed toward a cat 86*c*) may be turned off to avoid light beam reflections when acquiring camera-based images;

11) at 80*k*, using the handheld device camera and focusing optics 87*d* (depicted apart from the handheld device for illustration purposes only), acquire an image 87*a* that includes drawings of a cat 87*c* and a nearby unicorn 87*b*;

12) at 80*l*, compare interactive page layouts about cats previously acquired at step 80*h* with the camera-based image 87*d* (containing drawings of a unicorn 87*e* and cat 87*f*) to determine a match and best alignment within a layout;

13) at 80*m*, isolate a region of the camera image 88*a* that includes the location or region of light beam reflection 88*b* (whether the beam is turned on or not) indicating a section by the device user in the region of a cat 88*c*;

14) at 80*n*, based on the selected location or region within the page layout previously acquired at step 80*h*, identify the selected object (i.e., as a cat named "Sam") along with interactive elements (including Sam's ability to purr at 89*b*) from the page layout dataset; and 15) at 80*o*, perform audible (a purring sound from the handheld device speaker 89*f*) and visual (spell the name "SAM" on three device displays 89*e*, 89*d*, 89*c*) interactive actions based on the handheld device selection.

Figure 9:
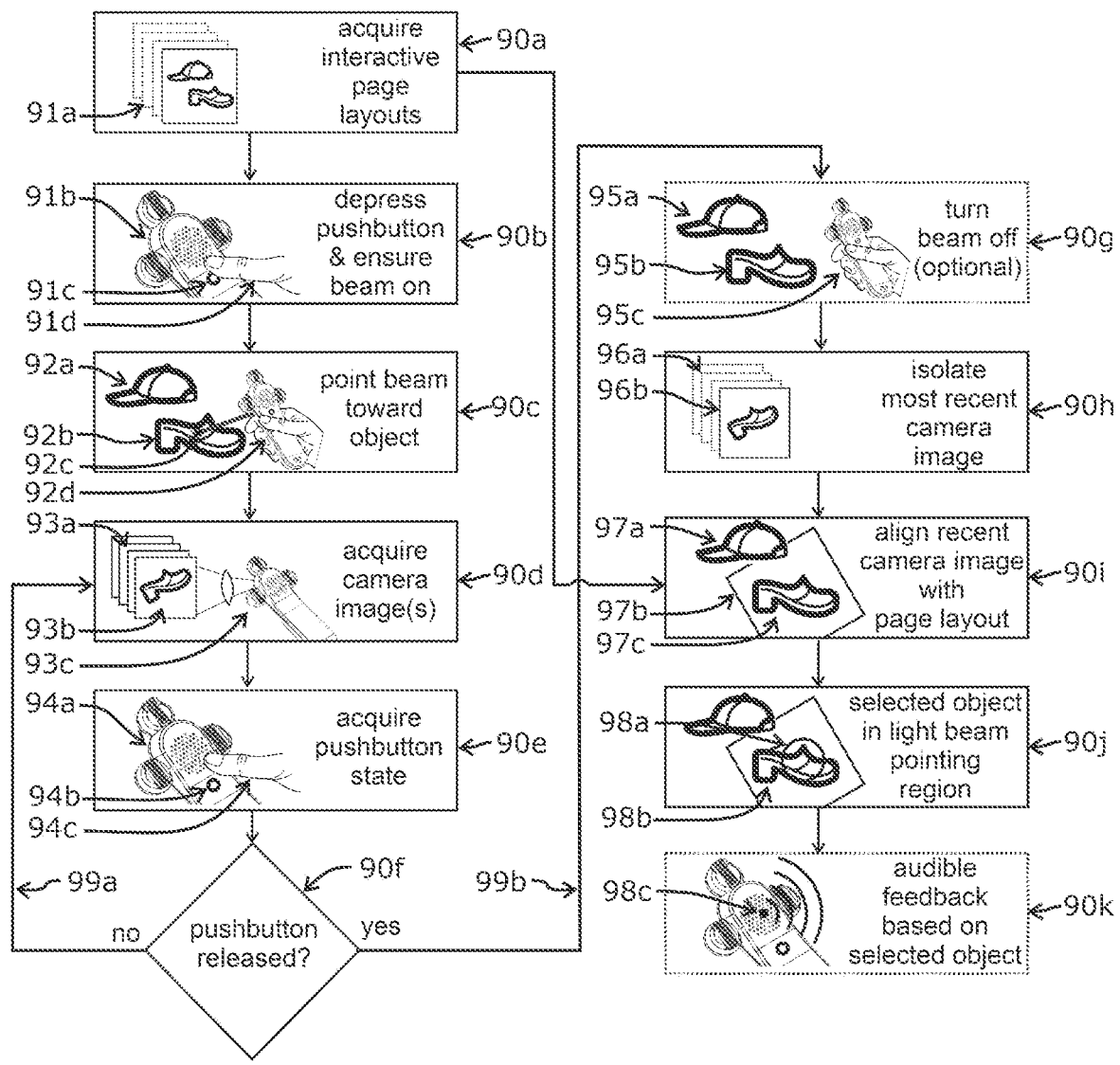
FIG. 9 is an exemplary flow diagram in which a push-button turns a light beam on and off, and signals a selection when choosing from a collection of apparel, resulting in audible feedback related to shoes.

FIG. 9 is a flow diagram in which a handheld device pushbutton 91*c* is used to turn a light beam 92*c* on and off, and to indicate that a selection has been made by the device user. In this exemplary case, selecting a shoe 92*b* from items of apparel results in audible descriptions at 98*c* (e.g., related to shoe performance). Additionally, isolating a camera-based image collected just prior to releasing the pushbutton avoids motion-based distortion of the image as a result of releasing the pushbutton. Exemplary steps in this process include:

1) at 90*a*, the processor of the handheld device acquires page layouts 91*a* that include apparel choices;

2) at 90*b*, using a thumb 91*d*, the user depresses a pushbutton 91*c* of the handheld device 91*b* to turn on a pointing light beam (if not already on and/or to indicate to the device that a selection is about to be made);

3) at 90*c*, the user manipulates the handheld device 92*d* to point the light beam 92*c* toward a shoe 92*b* (located on a page adjacent to a baseball cap 92*a*);

4) at 90*d*, the handheld device camera and optics 93*c* collect images 93*a* in which the camera's field-of-view includes the shoe 93*b* being pointed at by the device user;

5) at 90*e*, the processor within the handheld device 94*a* acquires the state of a pushbutton 94*b* to determine if it has been released by the user's thumb 94*c*;

6) at 90*f*, if the pushbutton has not been released, then return at 99*a* to step 90*d* to await pushbutton release, otherwise proceed at 99*b* to determine a page region being pointed at;

7) optionally (indicated by the dashed line outline), at 90*g*, turn off the light beam 95*c* (pointed toward the region of an interactive page containing a baseball cap 95*a* and shoe 95*b*);

8) at 90*h*, in order to avoid consequences of movement within camera images as the pushbutton is released, isolate a most recently acquired image 96*b* (i.e., prior to pushbutton release) from the series of acquired images 96*a*;

9) at 90*i*, compare page layouts previously acquired at step 90*a* with the camera field-of-view 97*b* (containing a small portion of a hat 97*a* and a shoe 97*c*) to determine a match and best alignment within a page layout;

9) at 90*j*, based on the selected beam location within the page layout 98*a*, identify the selected object (i.e., as a shoe 98*b*) and acquire interactive elements from the page layout dataset; and 10) at 90*k*, acquired from the selected page dataset, play an audible description related to the selected shoe using the handheld device speaker 78*b*.

As described above within the Detailed Description, methods may include encouraging or "mentally nudging" a device user to position a handheld device toward a target distance from a viewable surface. The viewable surface may include text, symbols, pictures, drawings, or other content that may be identified and/or selected by the device user based on pointing a light beam and images acquired by a handheld device camera, co-aligned with the device beam. Encouragement to position the handheld device at about the target distance may arise as a result of the user being able to perceive and/or recognize an in-focus, light beam pattern reflected off the viewable surface.

Particularly if the visualized pattern is perceived as pleasing (e.g., a smiley face, the outline of a favorite toy, and the like) and/or utilitarian (e.g., a pointing arrow, the outline of a finger and the like), a tendency of the handheld device user may be to keep the image projected by the beam in focus and, as a consequence, keep the handheld device separated by about a target working distance from the viewable surface. As described in greater detail below, maintaining the handheld device at about a target distance from the viewable surface concurrently governs a field-of-view of a co-aligned device camera.

When used by young children, some patterns (e.g., a smiling face) may evoke a positive or desirable reaction that is inherent and/or reinforced by interactions within the child's environment (e.g., viewing familiar forms and/or faces). Within further examples, a beam pattern that is eye-catching (e.g., containing vivid colors) and/or unattractive (e.g., angry face or frightening form) may be particularly attentive or heedful to some device users. Beam image patterns may include a human face projecting any of a range of expressions, an animal face (e.g., cute or fierce looking), an animal form, a recognizable shape, a cartoon character, a toy, a circle, a rectangle, a polygon, an arrow, a cross, a finger, a hand, character(s), number(s), other symbol(s), and an emoji. Additionally, projected beam images may, for example, be animated, made to morph (e.g., in color, intensity and/or form), projected as a series of images, and/or made to blink.

Viewable surfaces where a beam image may be visualized may be constructed from paper, cardboard, film, cloth, wood, plastic, or glass. The surface may be painted, printed, textured, enhanced with three-dimensional elements, and/or flexible. The viewable surface may additionally be some form of electronic display, including an electronic reader, tablet, sign or mobile device. The viewable surface may also, for example, be a component of a book including a book cover, brochure, box, signage, newspaper, magazine, printable surface, tattoo, or display screen.

Within additional examples, a beam image may be most recognizable when the handheld device is positioned by a device user normal to the viewable surface (i.e., in addition to being in focus). When about normal to the viewable surface, the beam image may appear most consistent with structured light patterns within the handheld device beam. If a projected beam were directed toward a location on the viewable surface away from the surface normal and/or at an acute angle, the beam image reflection would appear skewed (e.g., elongated in the axis of the handheld device away from the surface normal) and/or increasingly distorted as a result of any surface curvature and/or imperfections.

Within further examples herein, consequences of maintaining the handheld device at about a target working distance and pointed roughly normal to the surface may include: 1) maintaining a predetermined, target field-of-view area by a camera pointed in the same direction as the light beam, 2) avoiding camera-acquired images of the reflective surface that are skewed as a result of viewing from an angle that is not about normal to the surface, and/or 3) insuring that camera-acquired images of objects on the viewable surface are in focus by camera optics with a depth-of-field that includes any target distance (e.g., that may be governed by the device processor, as described further below).

Within camera systems that do not incorporate abilities to zoom (or other methods to adjust focusing optics), a camera's field-of-view is largely dictated by the distance from the camera's light sensor array to a viewable surface. As a consequence, if, for example, a camera acquires an image of a region containing a small object, far away from the handheld device (or, more specifically, from the camera sensor array), the object may appear as a small dot (i.e., having little or no structure, defined by a small number of camera pixels). Conversely, if the device camera is held too close to a viewable surface, only a small portion of an object may be seen within camera-acquired images. Identifying such objects, or even determining that a target object is present, may challenge CV-based processing.

Even when applying CV to less extreme situations, greater accuracy and robustness to identify objects within camera-acquired images may be attained when the size range of object profiles is within a target range that ensures involvement of a sufficient number of pixels to identify object detail, but with a sufficient field-of-view to identify overall object form. Limiting CV-based approaches to a size range at about the focusing distance of the beam may simplify, for example, neural net training, object template definitions and/or other CV-based algorithmic approaches.

Within further examples herein, an ability to change the focusing distance of a projected beam image may allow a handheld device to influence working distance by encouraging a device user to follow (i.e., by positioning to keep the beam image in focus) changes in beam focusing distance. As a consequence, the field-of-view and sizes of objects within images acquired by a co-aligned camera may be controlled (indirectly) via control of beam focusing distance.

Applications that involve interacting with viewable objects with differing sizes may benefit from control of working distance enacted by controlling beam focusing distance. As an example, CV-based processing (e.g., optical character recognition) of camera-acquired images may benefit from a reduced working distance (and, consequently a smaller camera field-of-view in which objects are consequently imaged by more pixels) when identifying text printed in a small font. Conversely, if a page within a book contains large images of objects with little detail (e.g., cartoon drawings or characters) then CV processing of camera-acquired images may benefit from a greater working distance (i.e., beam focusing distance).

Additionally, if the focusing distance of the beam is altered under control of the device processor, the area covered by a camera's field-of-view and, consequently, the size of objects within a camera's sensor array (i.e., number of pixels impacted by each object) may be estimated and/or known during CV-based methods to identify such objects.

Within miniature, beam-forming optical configurations of a handheld device, focusing distance may be controlled by altering the distance traveled by the beam prior to beam-forming optics, or by altering the beam-forming optics (e.g., changing the shape or position of optical elements). One or more of these strategies may be enacted at one or more locations along the beam light path. The light path may be changed by inserting and/or moving one or more reflective surfaces or refractive elements (e.g., to change the beam path).

Reflective surfaces may be components of, for example, a micro-electromechanical system (MEMS) apparatus actuating one or more mirrored surfaces to steer an entire beam or beam elements (separately). Alternatively, or in addition, one or more multi-sided prisms (typically using internal reflection) may be affixed to an actuator to alter light path. Within further examples, one or more miniature, shape-shifting lenses may be included in the light path. Miniature actuators to alter reflective or refractive elements may employ piezoelectric, electrostatic and/or electromagnetic mechanisms, operatively coupled to the device processor.

A plurality of reflective surfaces (e.g., in a range from two to ten or more) may amplify the effects of small movements of light-directing elements that change focusing distance. Within miniature beam-forming elements within a device designed to be held by a hand (e.g., with a light path in a range less than a few millimeters), changes in a light path within the sub-millimeter range may produce changes focusing distance of a light beam in the range of centimeters.

The target beam focusing distance may be altered dynamically based on, for example, the interactive visual environment, types of interactions being enacted, individual user preferences, and/or characteristics of viewable content (particularly selectable object size and degree of selectable object detail needed for object identification). A desktop environment in which a user points at objects within a handheld book may benefit from a short beam focusing distance compared with, for example, pointing toward an electronic screen on a large tabletop. Rapid, back-and-forth interactive sequences may also benefit from shorter target beam distances. User preferences may take into account, visual acuity, age and/or motor skills of an individual (particularly of a child). As different books or magazines with differing font and/or image sizes are chosen by a device user, beam focusing distance may be altered to accommodate for variations in such content (and accommodate convenient viewing by the user).

Within further examples, light beam image size may also be configured statically (e.g., using a light blocking filter) or altered dynamically. Dynamic control of beam image size may use techniques to similar modify focusing distance (i.e., moving or inserting reflective and/or refractive optical elements) to produce a light covering a range of sizes from a small, focused beam (e.g., the size of an alphanumeric character) to a region the size of a book page, or more. In the latter case, the light source of the handheld device may appear to function more relatable to a torch or flashlight compared with, for example, a so-called "laser pointer". Similar to the control of focusing distance, beam image size may take into account the types of interactions being enacted visual acuity, age and/or cognitive abilities of a user (particularly of a child).

As described above, although not strictly "handheld", the device may be affixed to, and positioned by, body parts other than a hand (e.g., temporarily or for prolonged periods). For example, the device may be affixed to an apparatus worn on a user's head. In this case, the illuminating light beam may not only provide an indication to the device wearer where the co-aligned device camera is pointed, but also inform others who are able to see the viewable surface where a center of attention for viewable content might be located. In some applications, a relatively large beam (e.g., comparable to a torch or flashlight, described above) may be effective in informing other nearby individuals which page or page regions being viewed along with any informational content contained within the beam (in addition to encouraging the device user to position the device about a target distance from the viewable surface).

Within additional examples herein, methods to generate a structured light pattern producing a recognizable beam image reflection on a viewable surface may include generating a pattern from multiple, addressable (i.e., by the device processor) light sources or reflective surfaces, and/or blocking or deflecting selected light. Exemplary methods include:
1. One or more light blocking filters (e.g., films or masks) may be inserted within the light beam path of a beam with forms that block all, or selected wavelengths, of light. This method generally requires optical elements to project the beam, and control in-focus planes for light blocking and display.
2. Digital light processing (DLP) projector techniques (e.g., DLP Pico systems by Texas Instruments) combine light generating elements with operable micro-mirrors that control light projection. Control of the array of micro-mirrors by a device processor facilitates dynamic displayed patterns.
3. A liquid crystal (LC) filter or projection array (e.g., similar to those used in displays, manufactured by Epson and Sony) may be a component within the light path of a beam. An addressable LC array may be controlled by a device processor, allowing dynamic displayed patterns.
4. A plurality of light beam sources (e.g., LEDs, including so-called micro-LEDs manufactured by Mojo Vision), each coupled to the device processor may facilitate dynamic beam images. A LED array may contain a relatively small number of sources (e.g., a five by seven grid capable of producing alphanumeric characters and symbols) or a much larger number of sources capable of producing image detail including complex animations.

Device light beam sources may include one or more light-emitting (including incorporating quantum dot, micro-LED, and/or organic LED) or lasing diodes, and may be monochromatic or polychromatic. Light intensity (including turning the beam on or off) may be regulated (e.g., by an operatively coupled device processor) using a number of methods including controlling light beam driving current, and/or pulse width modulation of the driving current. Modulating light intensity or light color (e.g., by selecting from different light sources) may be used to attract attention of the device user, for example, when a selection process by the user is anticipated (e.g., by turning the beam on or making it blink) or to provide a "visual reward" (e.g., upon making a selection).

Beam intensity and/or wavelength(s) may also be modulated to account for environmental conditions during use. If used within a dark environment, for examples, sensed by a device photodetector and/or ambient light region (e.g., not containing the beam image) within camera-acquired images, beam intensity may be reduced to conserve power and/or not overwhelm the visual sensitivity of the handheld device user. Conversely, beam intensity may be increased in a bright or visually noisy environment.

Beam intensity and/or wavelength(s) may also be modulated to account for the reflectivity (including color) of a viewable surface in a region being pointed at. As an example, a beam composed of mostly green wavelengths may not reflect well or even be visible when aimed at a region of a drawing where mostly red pigment is located. The overall color of a reflective surfaces may be estimated within camera-acquired images from nearby areas that surround the beam image region. Beam color may subsequently be adjusted to make the reflection more apparent to both the device camera and user. Similar strategies may be used to compensate for an individual's visual acuity and/or account for beam intensity preferences.

As a further example, if the viewable surface comprises an electronic display (e.g., electronic reader, tablet), the intensity of beam reflections (including off subsurface structures) may be reduced due to the generally low reflectivity off such surfaces. Beam color and/or intensity may be adjusted (e.g., dynamically) to help ensure the beam image may be of sufficient intensity to be visualized by a device user.

Additionally, the low reflectivity off such surfaces measured within the beam image region in camera-acquired images may be used by the handheld device to determine the presence of some form of electronic display screen. A reduced or lack of a beam image may be coupled with determining the presence of dynamic changes of an individual object within the viewable surface. Movement or change in appearance of a viewable object in which the remainder of the viewable surface does not move in a concurrent fashion (e.g., indicating movement of the handheld device camera and/or the entire viewable surface) may help indicate the presence of an electronic display surface (e.g., containing dynamic content).

Within beam illumination methods that allow the structure light pattern of the beam to be altered (e.g., LC. DLP, array of LEDs), beam patterns may be changed dynamically, for example, as a prompting mechanism during a selection process (e.g., changing a facial expression, enlarging a component of the beam image) and/or as a reward following a selection (e.g., projecting a starburst pattern). Changing light patterns may be superimposed on dynamic changes in beam intensity and/or wavelengths.

Changing a beam projection pattern, intensity, and/or color may also be used as feedback by the handheld device to indicate to the device user, whether the device is being held at about a target distance from a reflective surface. If CV-based analyses of the beam projection region within a camera-acquire image determine that a beam image is out of focus (i.e., the handheld device is not being held at about the target distance from the reflective surface), then a change in beam pattern, intensity or color may be used to prompt the user to correct device positioning.

Such prompting may include, for example, removing detail within the projected image such that an outline of a beam pattern might be roughly visualized by the user if not too far out of focus, and/or altering beam intensity and/or color that is likely to be perceived, even within a severely out-of-focus beam image. As a further example, a smiley face (i.e., pleasing to most viewers) apparent within beam images when in focus may transition toward a frown or sad face (e.g., that might still be recognized) as the handheld device is moved away from the target distance.

Alternatively, or in addition, handheld device positioning feedback may include other modalities. The use of other feedback modalities may be useful in situations when the beam image is excessively out of focus (i.e., the beam image may not be discernible) and/or when there is little or no device processor control device over the beam image (e.g., the beam is formed using a simple, light-blocking filter in the light path).

Positioning feedback may employ audible, other visual sources, or haptic means to prompt the device user. For example, if a speaker is included within a handheld device and operatively coupled to the device processor, audible prompts or cues may be provided when the beam is determined (within camera-acquired images) to be in focus or, conversely, not in focus. A display or other light source (i.e., not associated with the beam) operatively coupled to the device processor may provide similar feedback by changing display intensity, colors, or content. Along similar lines, a haptic unit may be operatively coupled to the device processor and activated when the light beam is not in focus (or alternatively, when focus is acquired).

Within each of these alerting or notifying modalities, measures of the degree of focus may be reflected in the feedback. The amplitude, tone and/or content (including words, phrases or whole sentences) of sounds played on a speaker may reflect the degree of focus. Similarly, the brightness, color and/or content of visual cues or prompts may be modulated based on a measured degree of focus. The frequency, amplitude and/or pattern of haptic stimulation may similarly indicate, to the device user, how close the handheld device is to being at the target distance from the viewable surface.

As just described, measures of the degree of focus within the beam image region of camera-acquired images may be used as a basis for user feedback (and/or for performing one or more other actions). A number of CV-based methods are known in the art to determine a degree of focus within an overall image or within image sub regions. At the simple end of a spectrum of methods (e.g., more easily implemented), an increased focus is generally associated with an increase in contrast (especially if image shape does not change). Thus, measured contrast within an image region may be used as an indication of degree of focus.

Additionally, a number of kernel-based operators (two-dimensional in the case of an image), including computing the Laplacian, may be used to estimate edge sharpness and associated focus. An image or image region may be converted to frequency space via Fourier transform methods where an in-focus image may be determined within images with greater magnitudes of high frequency components.

An artificial neural network (ANN) trained to measure focus within an image may also provide a measure of focus. Such trained networks may be trained relatively quickly and/or kept small (e.g., a reduced number of nodes and/or layers) if the image region is small and well-defined (see, e.g., FIG. 10), and image profiles are based on a small, predefined dataset of potential beam projection images.

Within further examples herein, operational questions that may arise when performing one or more actions during interactive sequences using a light beam to point toward a selectable region on a viewable surface include: How can a user be informed of the boundaries of selectable regions, when should camera-acquired images be processed to identify content within such regions, and when should a resulting device-generated action be performed? If, for example, the device processor were to apply CV analyses to every camera-acquired image available to the handheld device, then a user would likely quickly become overwhelmed with inadvertent actions and likely unable to effectively convey intent.

Addressing these questions may include methods to inform the user of the boundaries of each region associated with a selectable action. When a handheld device brings the page of a book or magazine "to life", the size and/or number of objects that might be included in a particular region that, when selected, produces an action, may not be apparent. For example, within a page section containing text, in some cases (e.g., when learning to spell) an individual letter may be a selectable or actionable object. In other cases, a word, a phrase, a sentence, a paragraph, a cartoon bubble, a description and associated drawing may each (i.e., without being evident to a device user) be within an individual region that, when selected, produces an action.

One method of providing feedback to inform the user of selected regions or actionable boundaries includes providing one or more audible indications when transitioning from one region to another and/or when hovering over an actionable region for a brief period of time. Since a user may easily point or quickly swish the beam through multiple actionable regions within a brief period, an audio indication or prompt sound (e.g., ping, ding, chime, clink, clang) may typically be short-lived (e.g., lasting less than one second). Furthermore, if multiple actionable areas are detected in rapid succession, then an ongoing prompt sound may be quickly aborted and/or one or more queued prompts may be eliminated, so as not to overwhelm the device user.

Different sounds or prompts may be generated depending on an identity or classification within the "flyover" or "hover" region. For example, a region that, if selected, may result is an interactive query originating from the handheld device may generate a more alerting, "questioning" prompt; whereas a region that simply results in an interactive exchange (i.e., without questioning) may generate a distinct (e.g., less alerting) informative prompt. Within further examples, brief sound-effects associated with identified objects may be used as prompts. For example, the prompt for a region containing a cat may comprise a meow. More generally, prompt indications of regions being pointed at with a light beam may be dependent on predetermined page layout characteristics of the region and/or objects (e.g., identified using CV-based methods) within camera-acquired images of the region.

Alternatively, or in addition, one or more visual cues may be provided using either or both of display elements on the handheld device (e.g., indicator LED, orb, display panel) and/or the pointing beam. Similar to audible prompts just described, visual prompts indications when sweeping a beam through different actionable regions may be brief and designed not to overwhelm a device user. As examples, visual prompts may consist of changes in brightness (including blinking), color(s) and/or patterns of displayed content. Similar to the audible methods just described, visual prompts may be dependent on the information associated with the page layout of the identified region, and/or one or more objects determined within camera-acquired images of the region.

Visual prompts may be used by device users who are hearing impaired. Conversely, audible cues may be preferred by individuals who are visually impaired. Alternatively, or in addition, haptic prompts or cues may be generated via a haptic unit operatively coupled to the device processor. As a beam transitions into or dwells within an actionable region, a haptic prompt may be felt by the hand of the device user. The duration and/or intensity of a haptic cue may be dependent on page layout information associated with the region and/or one or more objects identified within camera-acquired images. For example, a prolonged (e.g. greater than one second), intense haptic prompt may be enacted when the beam is pointed at an identified region in which a query to the device user may be generated upon selecting the region.

Once a user becomes aware (e.g., via audible, visual and/or haptic means) that the beam is pointed toward an actionable region, the user may then indicate (i.e., to the handheld device) that a selection is being made. Such indications may be made via a switch component (e.g., pushbutton, toggle, contact sensor, proximity sensor) operatively coupled to the device processor and controlled by the device user. Along similar lines, selections may be indicated using voice control (e.g., an identified word, phrase, or sound) sensed by a microphone operatively coupled to the device processor. Alternatively, or in addition, movement (e.g., shaking) and/or orientation (e.g., relative to the gravitational pull of the earth) of the handheld device as it is manipulated by the device user may be sensed by an IMU operatively coupled to the device processor and used to indicate that a selection is being made.

Additionally, indicating methods (e.g., using voice or a switch) may be tied to one or more audible, visual and/or haptic prompts just described. During a selection interaction, prompts may be used to signal when an indication is expected and/or an indication modality. This interactive strategy may help to avoid a user unnecessarily generating indications at unexpected times, generate an indication using an expected modality (e.g., voice versus switch), and/or provide further input (i.e., to the handheld device processor) during a selection process. As an example of the latter, a visual prompt may be provided where a displayed color may correspond to a color of one of a plurality of distinctly colored pushbutton switches (e.g., in which contact surfaces may also differ in size and/or texture). Pressing a pushbutton colored similarly to the displayed color may indicate agreement with interactive content; whereas pressing another button might signal disagreement, an alternative selection, or an unexpected reaction by the device user.

Figure 10:
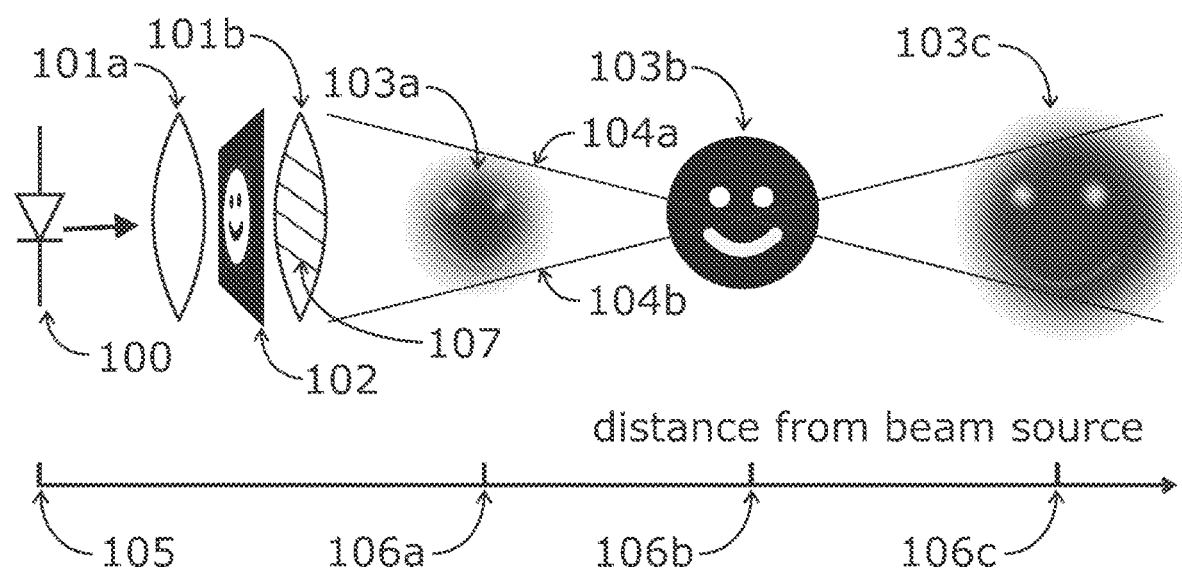
FIG. 10 is an exemplary diagram illustrating formation of a structured light pattern that produces a reflected beam image (i.e., forming a smiley face) perceived by a device user as being in-focus at about a target working distance between the handheld device and a reflective surface, and a blurry image (i.e., not in-focus) otherwise.

FIG. 10 is an exemplary diagram (with elements similar to a light ray diagram) illustrating formation of a structured light pattern using a light-blocking filter 102 and an in-focus reflected beam image 103b produced at a preferred or target working distance between the handheld device beam source 105 and a viewable surface that reflects the beam 106b. An in-focus reflection encourages a device user (e.g., particularly if pleasing to the user) to manipulate the handheld device at the target working distance. At distances less than (e.g., at 106a) or greater than (e.g., at 106c) about the desired working distance at 106b, a blurry image (i.e., not in-focus) may be observed (e.g., 103a and 103c), discouraging handheld device manipulation and/or operation in these regions.

In this example, a structured light pattern is formed using a light source (e.g., a LED at 100) that passes light through one or more optical elements 101a, allowing a blocking filter 102 to then structure the light pattern. Depending on the image-forming characteristics of the light source (e.g., a directed array of sources and/or whether collimating optics are included within the source), some beam-forming configurations may not require optical elements depicted at 101a.

A second set of one or more optical elements 101b allows projection of the structured light pattern as a beam (with light ray elements illustrated at 104a and 104b). The beam image, a smiley face 103b, appears in-focus at a target working distance 106b from the device light source 105. If the handheld device is held too close to a reflective surface, then the beam image appears out-of-focus 103a. If the beam is configured to diverge slightly over typical working distances (e.g., up to one meter), then the out-of-focus reflective image may also appear smaller (e.g., compared with an in-focus, or any more distant beam image). Similarly, if the handheld device is held too far from the reflective surface at 106c, then the beam image also appears to the device user to be out-of-focus 103c (and larger in the case of a diverging beam).

Optionally, optical elements may additionally include one or more moveable reflective surfaces (e.g., at 107) operatively coupled to the device processor. Such surfaces may be components of, for example, a MEMS apparatus and/or multi-sided prism that may change the light path distance from a light source 100 to focusing and/or collimating optics 101b. Optical components depicted at 101b may include one or more optical elements that guide light into and/or out of the reflective surface region 107.

In the exemplary beam image pattern shown within FIG. 10, in order to illustrate an overall circular beam structure, bright (i.e., illuminated) elements of the beam image are drawn as dark components 103b (i.e., on a white figure background). Along similar lines, elements within the light blocking filter at 102 that allow light to pass have been made to appear white (again, allowing the circular pattern of the overall beam to be visualized). In general, blocking elements to structure light may block selected or all wavelengths (e.g., using film or LCD filters), and introduce a wide range of image complexity, as long as the diffraction limit of light (at a particular wavelength) is not violated. Systems in which structure light patterns are generated directly (e.g., an array of LEDs or micro-LEDs, DLP projection) may produce beam images with similar complexity and optical limitations.

Figure 11:
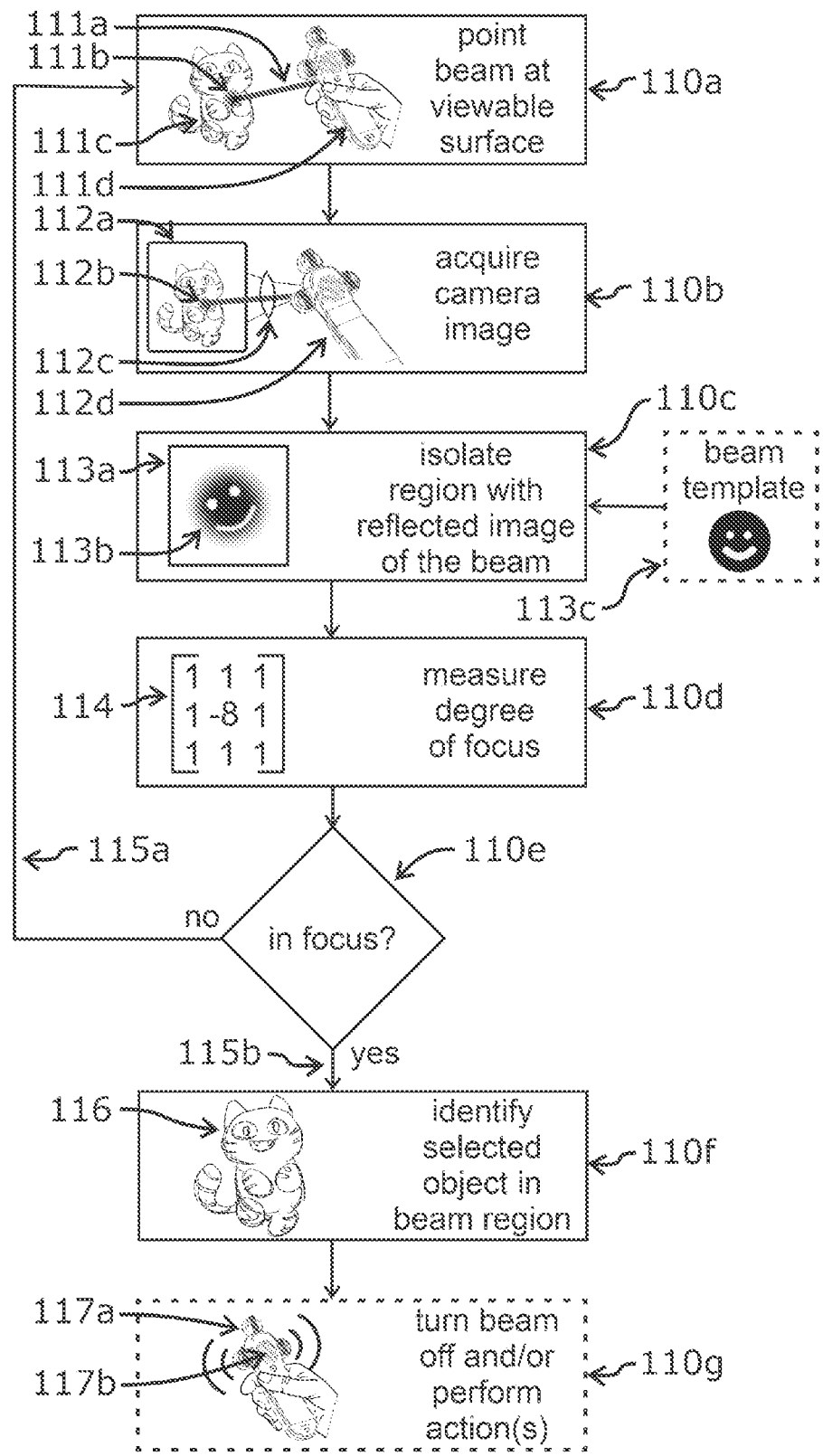
FIG. 11 is a flow diagram illustrating exemplary steps for machine-based determination of whether the device pointing beam is in focus, and to perform one or more actions based on whether the beam is in focus (i.e., the handheld device is at about the desired distance from a viewable surface).

FIG. 11 is a flow diagram illustrating exemplary steps in which, in addition to viewing the beam reflection by the device user to determine whether in focus (i.e., at about a desired distance), beam focus may be computed from a beam-pointing region within one or more camera-acquired images 113a. Periodic or continuous machine-based assessments of whether the handheld device is at about the desired distance from the viewable surface may be used to provide positional feedback to the user as well as whether a viable beam-pointing selection (i.e., within a target camera field-of-view) is being made by the user 116. Such feedback to the user indicating whether the handheld device is being held at about the desired distance (or not) may include visual 117a, auditory 117b and/or haptic prompts. Exemplary steps in this process include:

1) at 110a, the user points a structured light beam at 111a emanating from the handheld device 111d toward a selected object (in this case, a cat at 111c) on a viewable surface, generating a beam reflection at 111b;
2) at 110b, using a camera (not visible) and focusing optics 112c (depicted apart from the body of the handheld device 112d for illustration purposes only), acquire an image in which the camera's field-of-view 112a includes the beam reflection at 112b;
3) at 110c, isolate the region 113b within the camera-acquired image 113a based on knowing the beam pointing region within the co-aligned beam and camera image, and/or using computer vision methods that may optionally (indicated by the dashed line outline) include comparing one or more regions of the camera field-of-view with a predetermined template of the (in focus) beam image at 113c;
4) at 110d, measure (by the device processor) the degree of focus within the camera-acquired image at the beam pointing region using kernel operators (as depicted at 114) and/or any of a number of additional computer vision techniques to determine degree of focus;
5) at 110e, determine whether the beam image is sufficiently in focus to be within about the desired distance and, if so, continue processing the camera-acquired image at 115b, otherwise (i.e., if not, at 115a) allow the user to continue manipulating the handheld device at 110a;
6) at 110f, continued image processing may include identifying text, symbols and/or one or more objects in the vicinity of the (determined to be in focus) beam where identifying a feline form is depicted at 116;
7) at 110g, optionally (indicated by the dashed line outline), provide visual (e.g., via one or more device displays at 117a, and/or by modulating beam intensity including turning it off as depicted), audible (using a device speaker at 117b) and/or haptic feedback to the device user that the handheld device was positioned properly and a selection has been made, triggering one or more actions by the device processor.

The foregoing disclosure of the examples has been presented for purposes of illustration and description. It is not intended to be exhaustive or to limit the invention to the precise forms disclosed. Many variations and modifications of the examples described herein will be apparent to one of ordinary skill in the art in light of the above disclosure. It will be appreciated that the various components and features described with the particular examples may be added, deleted, and/or substituted with the other examples, depending upon the intended use of the examples.

Further, in describing representative examples, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A handheld device, comprising:
a device body configured to be manipulated by a hand of a device user;
electronic circuitry within the device body that includes a device processor;
a device light beam source configured to emanate a light beam away from the device body to generate a beam image reflection creating an image on a viewable surface, the image in focus at a predetermined distance from the viewable surface; and
a device camera operatively coupled to the device processor and aligned such that a field-of-view of the device camera includes the beam image reflection, wherein the handheld device is configured to:
generate the beam image reflection on the viewable surface such that the image is viewable by the device user and is in focus at the predetermined distance to encourage the device user to position the handheld device at the predetermined distance from the viewable surface; and
acquire a camera image.

2. The handheld device of claim 1, wherein the device light beam source is one of one or more light-emitting diodes, one or more micro-light emitting diodes, one or more lasing diodes, and one or more digital light processing projector elements, each operatively coupled to the device processor.

3. The handheld device of claim 1, wherein the beam image reflection appears to the device user as one of a smiley face, a human face, an animal face, a toy, a cartoon character, a circle, a rectangle, a polygon, an arrow, a cross, a finger, a hand, one or more characters, one or more numbers, one or more symbols, one or more recognizable shapes, and an animation.

4. The handheld device of claim 1, wherein a structured light pattern producing the beam image reflection is generated by one of one or more light blocking filters within a light path of the device light beam source; liquid crystal filter elements within the light path of the light beam source, each operatively coupled to the device processor; digital light processing projector elements, each operatively coupled to the device processor; and a plurality of light beam sources, each operatively coupled to the device processor.

5. The handheld device of claim 4, wherein the device processor changes the structured light pattern based, at least in part, on content determined by the device processor within the camera image.

6. The handheld device of claim 1, wherein the light beam source is operatively coupled to the device processor and further configured to control a light beam intensity by one or both of regulating a light beam driving current, and a pulse width modulation of the light beam driving current.

7. The handheld device of claim 6, wherein the device processor is further configured to:
identify the image in the camera image; and
control the light beam intensity based on a detected light intensity measured in the camera image within one or both of a beam image reflection region and an ambient light image region not containing the image.

8. The handheld device of claim 1, wherein the image comprises one of an object, symbol, or pattern on the viewable surface.

9. A method to encourage a device user to position a handheld device a predetermined distance from a viewable surface, wherein the handheld device comprises a device body configured to be manipulated by a hand of the device user; electronic circuitry within the device body that includes a device processor; a device light beam source configured to emit a light beam to generate a beam image reflection creating an image that is in focus at the predetermined distance; and a device camera operatively coupled to the device processor and aligned such that the device camera field-of-view includes the beam image reflection, the method comprising:
generating, by the device light beam source, the beam image reflection on the viewable surface such that the image is viewable by the device user and is in focus at the predetermined distance to encourage the device user to position the handheld device at the predetermined distance from the viewable surface; and
acquiring, by the device camera, a camera image.

10. The method of claim 9, further comprising:
identifying, by the device processor, the image in the camera image; and
determining, by the device processor, a beam state of the beam image reflection within the camera image as one of in focus and out of focus, and performing an action by the device processor based, at least in part, on the beam state.

11. The method of claim 10, wherein the determining the beam state includes computing, by the device processor applied to the camera image, one or more of a trained neural network, one or more kernel operations, one or more image contrast measurements, and a Fourier transform.

12. The method of claim 10, wherein the light beam source is operatively coupled to the device processor, and the action comprises changing one or more of a beam intensity, a beam color, and a beam structured light pattern.

13. The method of claim 10, wherein a haptic unit within the handheld device is operatively coupled to the device processor, and the action comprises activating the haptic unit.

14. The method of claim 10, wherein a device speaker within the handheld device is operatively coupled to the device processor, and the action comprises playing an indicating sound on the device speaker.

15. The method of claim 9, wherein the viewable surface is constructed from one or more of paper, cardboard, film, cloth, wood, plastic, glass, a painted surface, a printed surface, a textured surface, an enhanced surface enhanced with three-dimensional elements, a flexible surface, and an electronic display.

16. The method of claim 9, wherein the viewable surface is a component of one or more of a book, a book cover, a brochure, a box, a sign, a newspaper, a magazine, a tablet, a printable surface, a tattoo, a mobile device, an electronic book reader, and a display screen.

17. The method of claim 9, wherein the image comprises one of an object, symbol, or pattern that is viewable on the viewable surface.

18. A method to encourage a device user to position a handheld device a predetermined distance from a viewable surface, wherein the handheld device comprises a device body configured to be manipulated by a hand of the device user; electronic circuitry within the device body that includes a device processor; a device light beam source configured to emit a light beam to generate a beam image reflection creating an image that is viewable on the viewable surface; one or more moveable reflective surfaces within a device beam light path originating from the device light beam source, each operatively coupled to the device processor; and a device camera operatively coupled to the device processor and aligned such that the device camera field-of-view includes the beam image reflection, the method comprising:
generating, by the device light beam source, the image on the viewable surface;
moving, by the device processor, the one or more moveable reflective surfaces to make the beam image reflection of the image in focus at the predetermined distance to encourage the device user to position the handheld device at the predetermined distance from the viewable surface; and
acquiring, by the device camera, a camera image.

19. The method of claim 18, wherein the one or more moveable reflective surfaces each comprises one or more moveable mirrors, one or more micro-electromechanical systems, and one or more moveable prisms.

20. The method of claim 18, wherein the moving the one or more moveable reflective surfaces changes one or both of a light beam path distance and a light path direction travelled by a device light beam.

* * * * *